(12) United States Patent
Uchida

(10) Patent No.: US 9,021,570 B2
(45) Date of Patent: Apr. 28, 2015

(54) SYSTEM, CONTROL METHOD THEREFOR, SERVICE PROVIDING APPARATUS, RELAY APPARATUS AND COMPUTER-READABLE MEDIUM

(75) Inventor: Takayuki Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 377 days.

(21) Appl. No.: 13/523,343

(22) Filed: Jun. 14, 2012

(65) Prior Publication Data

US 2013/0019300 A1    Jan. 17, 2013

(30) Foreign Application Priority Data

Jul. 15, 2011 (JP) .................................. 2011-157125

(51) Int. Cl.
*G06F 21/41* (2013.01)
(52) U.S. Cl.
CPC ...................................... *G06F 21/41* (2013.01)
(58) Field of Classification Search
CPC ................................... G06F 21/00; H04L 9/32
USPC ................................................................ 726/8
See application file for complete search history.

(56) References Cited

U.S. PATENT DOCUMENTS

| 7,784,092 B2 * | 8/2010 | Pearson et al. ..................... 726/8 |
| 2009/0119763 A1 * | 5/2009 | Park et al. ......................... 726/8 |
| 2010/0290081 A1 | 11/2010 | Uchida |
| 2010/0293602 A1 | 11/2010 | Uchida |
| 2011/0072512 A1 * | 3/2011 | Je et al. ............................ 726/21 |
| 2012/0117629 A1 * | 5/2012 | Miyazawa et al. ................. 726/4 |

FOREIGN PATENT DOCUMENTS

| JP | 10-187560 | 7/1998 |
| JP | 2003-346061 | 12/2003 |
| JP | 2010-526366 | 7/2010 |
| WO | 2008/136602 | 11/2008 |

OTHER PUBLICATIONS

Japanese Office Action issued on Feb. 27, 2015 during prosecution of related Japanese application No. 2011-157125.

* cited by examiner

*Primary Examiner* — Teshome Hailu
*Assistant Examiner* — Thanh Le
(74) *Attorney, Agent, or Firm* — Fitzpatrick, Cella, Harper & Scinto

(57) ABSTRACT

A system in which a first service providing apparatus, a second service providing apparatus, and at least one authentication apparatus cooperate with each other to provide a service by single sign-on to be used by a user, the second service providing apparatus comprises a management unit that manages belonging information for specifying a group to which the user belongs, and a transmission unit that transmits to the client terminal, when an instruction to provide a service by the first service providing apparatus is accepted from the user while providing a service by the second service providing apparatus, information for accessing the first service providing apparatus and the belonging information if the management unit manages the belonging information of the group to which the user belongs.

17 Claims, 24 Drawing Sheets

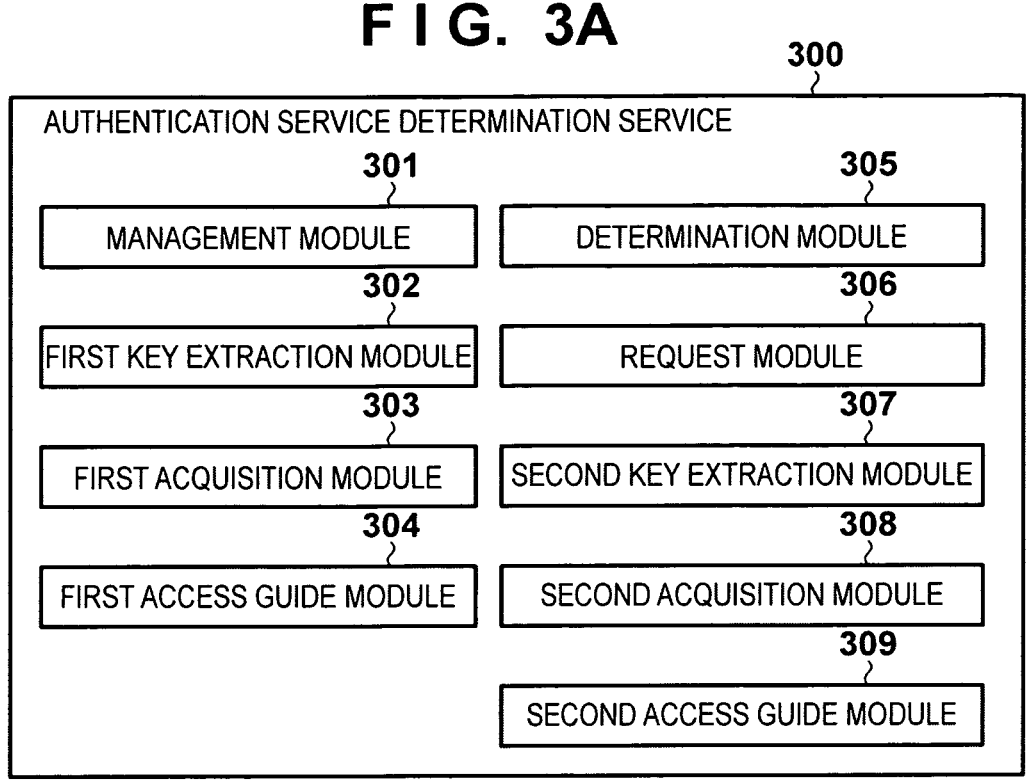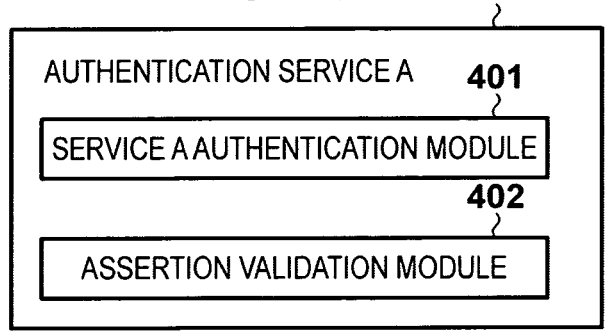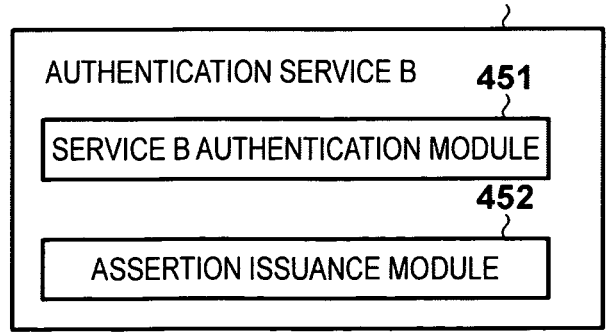

FIG. 6

| COMPANY ID | URL OF IdP |
|---|---|
| 11111111 | http://service_b/?sp=http%3A%2F%2Fservice_a%2F |
| 22222222 | http://service_a/ |
| 33333333 | http://service_b/?sp=http%3A%2F%2Fservice_a%2F |

BUSINESS OPERATION SCREEN

BUSINESS MEETING | CUSTOMER

<DETAILS OF BUSINESS MEETING>
BUSINESS MEETING NAME    AAA

<PRODUCT>

| PRODUCT NAME | AMOUNT | PRICE |
|---|---|---|
| CD | 1 | 2,000 |

CREATE DOCUMENT — 702

COMPANY ID [        ]

[TO AUTHENTICATION SCREEN]

AUTHENTICATION SERVICE A AUTHENTICATION PAGE

USER ID [        ]

PASSWORD [        ]

[LOGIN]

AUTHENTICATION SERVICE B AUTHENTICATION SITE | AUTHENTICATION WITH FOLLOWING INFORMATION

USER ID [        ]

PASSWORD [        ]

FIG. 9

| | BUTTON SETTINGS | |
|---|---|---|
| 901 | DISPLAY NAME | CREATE DOCUMENT |
| 902 | OPERATION | EXECUTE JavaScript CODE |
| 903 | CONTENTS | `var mainForm = document.createElement("form");`<br>`mainForm.action = "http://service_a/service";`<br>`mainForm.method = "GET";`<br>`document.body.appendChild(mainForm);`<br><br>`var tid = document.createElement("input");`<br>`tid.name = "TENANT_ID";`<br>`tid.value = <ACQUIRE COMPANY ID>;`<br>`mainForm.appendChild(tid);`<br><br>`var sid = document.createElement("input");`<br>`sid.name = "sessionid";`<br>`sid.value = "{!$Api.Session_ID}";`<br>`mainForm.appendChild(sid);`<br><br>`var url = document.createElement("input");`<br>`url.name = "serverurl";`<br>`url.value = "{!$Api.Server_URL}";`<br>`mainForm.appendChild(url);`<br><br>`var rid = document.createElement("input");`<br>`rid.name = "recordid";`<br>`rid.value = "{!Opportunity.Id}";`<br>`mainForm.appendChild(rid);`<br>`}`<br><br>`var sub = window.open("about:blank","serviceA");`<br>`mainForm.submit();`<br>`}` |

F I G. 14
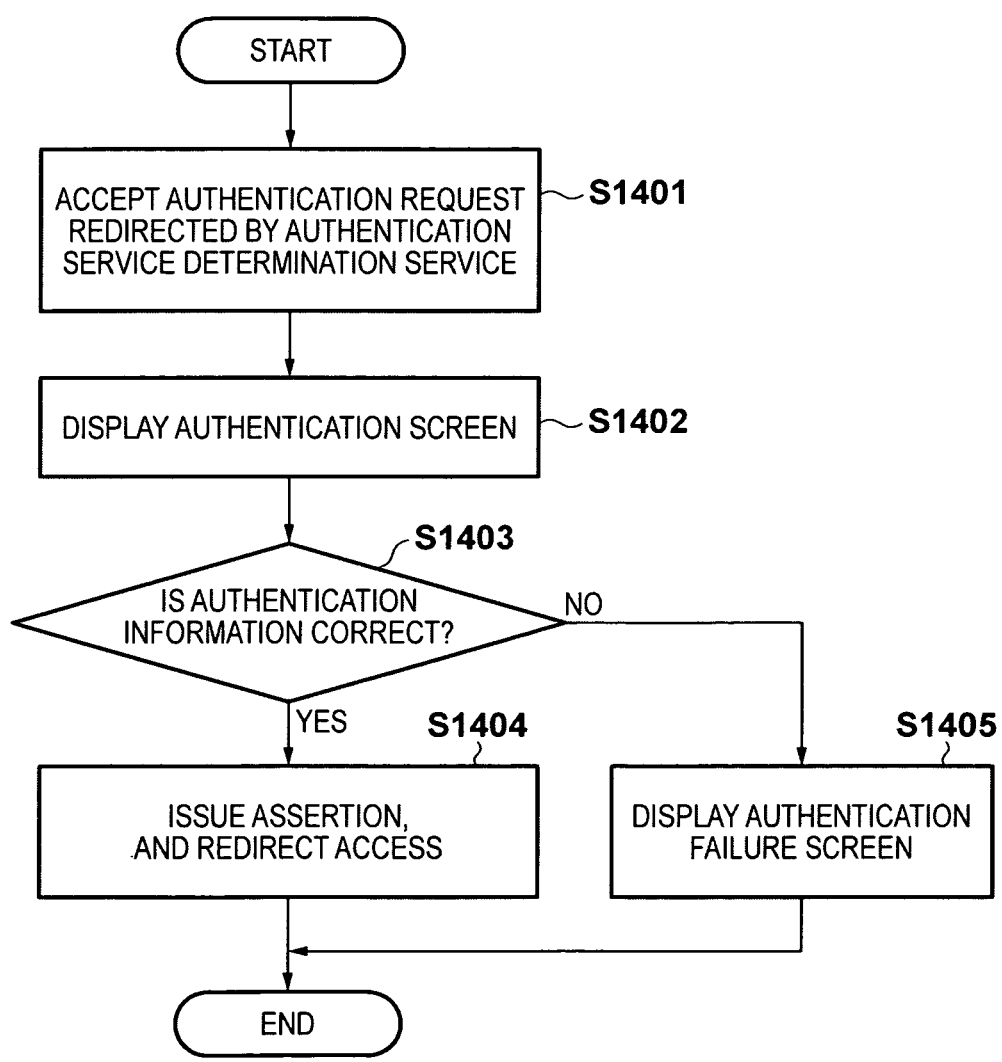

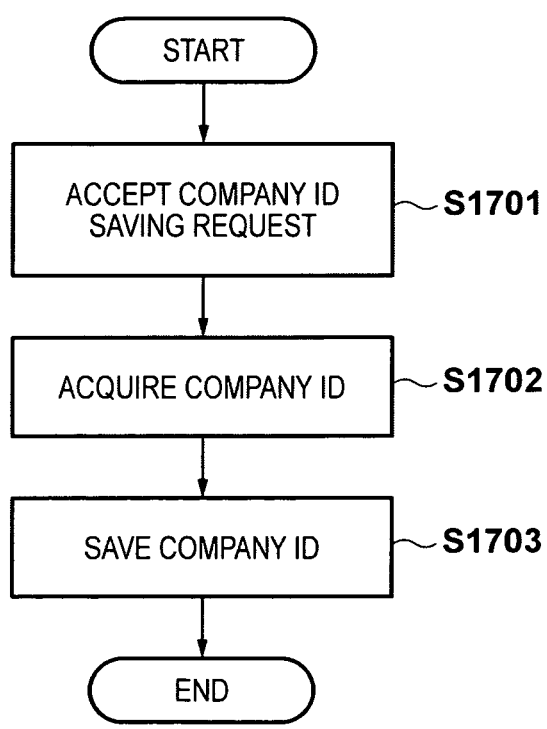
F I G. 17

FIG. 19

| BUTTON SETTINGS | |
|---|---|
| DISPLAY NAME | CREATE DOCUMENT |
| OPERATION | EXECUTE JavaScript CODE |
| CONTENTS | `var mainForm = document.createElement("form");`<br>`mainForm.action = "http://service_a/service";`<br>`mainForm.method = "GET";`<br>`document.body.appendChild(mainForm);`<br><br>`var tenantid = <ACQUIRE COMPANY ID>;`<br><br>`if (tenantid=="") {`<br>`var init = document.createElement("input");`<br>`init.name = "init";`<br>`init.value = "true";`<br>`mainForm.appendChild(init);`<br>`}`<br>`var tid = document.createElement("input");`<br>`tid.name = "TENANT_ID";`<br>`tid.value = tenantid;`<br>`mainForm.appendChild(tid);`<br><br>`var sid = document.createElement("input");`<br>`sid.name = "sessionid";`<br>`sid.value = "{!$Api.Session_ID}";`<br>`mainForm.appendChild(sid);`<br><br>`var url = document.createElement("input");`<br>`url.name = "serverurl";`<br>`url.value = "{!$Api.Server_URL}";`<br>`mainForm.appendChild(url);`<br><br>`var rid = document.createElement("input");`<br>`rid.name = "recordid";`<br>`rid.value = "{!Opportunity.Id}";`<br>`mainForm.appendChild(rid);`<br>`}`<br><br>`var sub = window.open("about:blank","serviceA");`<br>`mainForm.submit();`<br>`}` |

901 — DISPLAY NAME
902 — OPERATION
1903 — CONTENTS

FIG. 24

| BUTTON SETTINGS | |
|---|---|
| DISPLAY NAME | CREATE DOCUMENT |
| OPERATION | URL |
| CONTENTS | http://service_a/service?TENANT_ID=&sessionid={!$Api.Session_ID}&serverurl={!$Api.Server_URL}&recordid={!Opportunity.Id} |

901 — DISPLAY NAME
2402 — OPERATION
2403 — CONTENTS

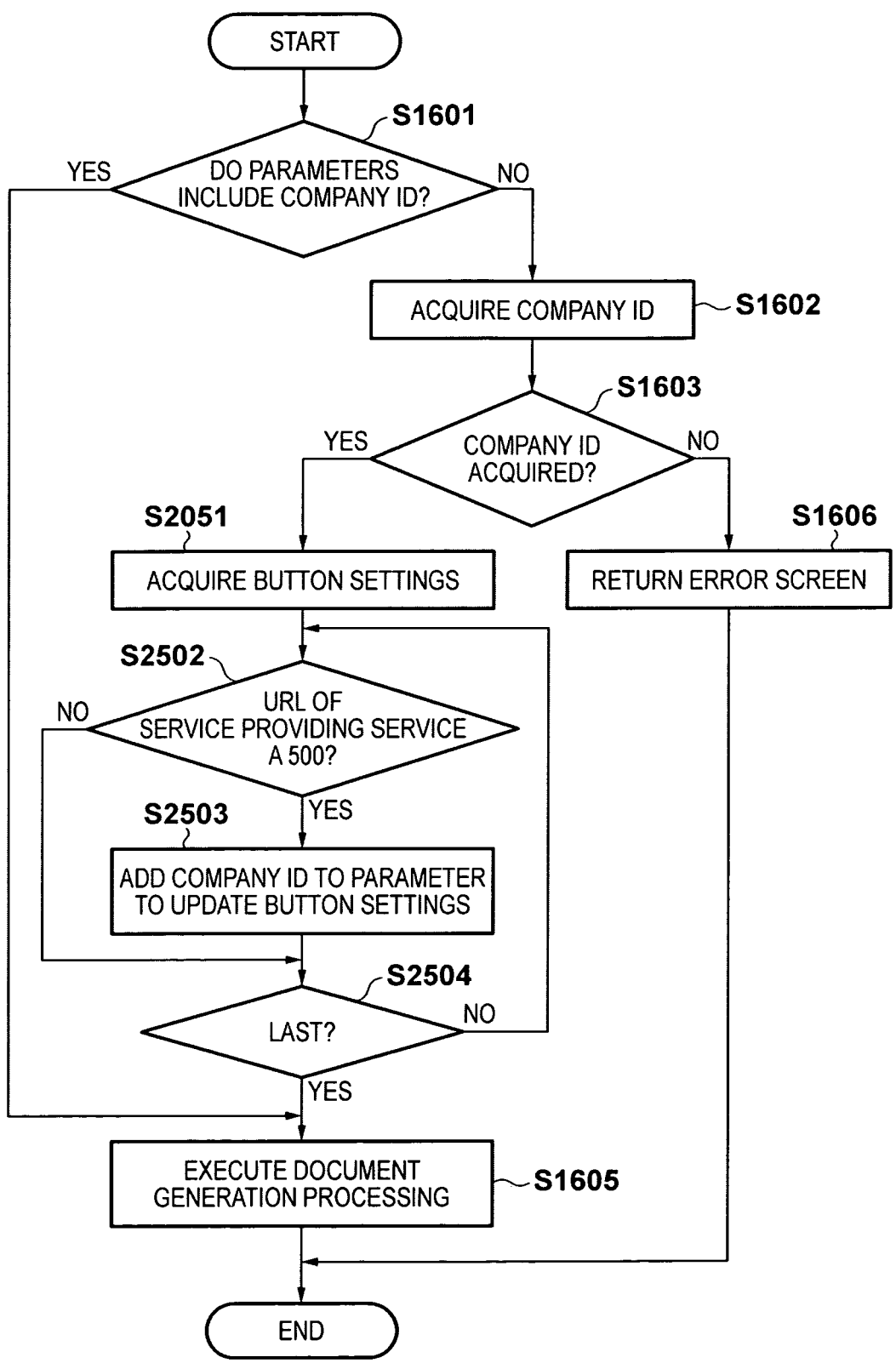

SYSTEM, CONTROL METHOD THEREFOR, SERVICE PROVIDING APPARATUS, RELAY APPARATUS AND COMPUTER-READABLE MEDIUM

BACKGROUND OF THE INVENTION

1. Field of the Invention

The present invention relates to a system which provides single sign-on, a control method therefor, a service providing apparatus, a relay apparatus, and a computer-readable medium.

2. Description of the Related Art

A mode in which business data are managed and undergo various processes on a cloud platform service has become widespread. A user accesses a Web page for the cloud platform service through the browser of a client PC via the Internet to display, on the Web page, business data which the user wants to view. If the user sends a document creation instruction through the screen, the instruction is redirected to a document generation service, which acquires the business data existing in the cloud platform service to generate a document. The document generation service then transmits the generated document to the client PC or the cloud platform service. A typical example of the cloud platform service is a Salesforce.com® provided by Salesforce.com, Inc.

The cloud platform service and document generation service operate in a multi-tenant environment. A tenant is a unit such as a company or organization which signs a contract to use the cloud platform service and the document generation service. A service operating in a multi-tenant environment manages data of a plurality of tenants in one system, and separately manages data for each tenant so that a given tenant cannot refer to data for another tenant. To allow each tenant to refer only to its own data, the cloud platform service and the document generation service perform user authentication.

If the cloud platform service and the document generation service cooperate with each other, it is possible to cause the services to cooperate and perform authentication without the need for the user to authenticate each service. There is conventionally known a single sign-on (to be referred to as SSO hereinafter) technique by SAML (Security Assertion Markup Language) as a technique of causing a plurality of services to cooperate to perform authentication. In SSO by SAML, the user holds both the ID of an authentication service providing side (an identity provider which will be referred to as an IdP hereinafter) and the ID of a side (a service provider which will be referred to as an SP hereinafter) which trusts the authentication result of an authentication service to provide a service.

When the user is authenticated by the IdP, the SP trusts the authentication result to authenticate the access as an ID to be managed within the SP (IdP precedence). If an unauthenticated user which has not been authenticated by the IdP accesses the SP, the SP guides the unauthenticated user to an appropriate IdP, which authenticates the user (SP precedence).

Each of the cloud platform service and the document generation service has different tenant information. To perform SSO, the cloud platform service and the document generation service need to know the tenants of each other. This is because each service needs to know its tenant which performs SSO, and a corresponding tenant of the other.

There has conventionally been provided a technique of synchronously holding the pieces of tenant information of the services. Japanese Patent Laid-Open No. 10-187560 discloses a technique of synchronously holding pieces of tenant information in all servers, and receiving a tenant information change notification from another server to update the tenant information.

A tenant which uses the cloud platform service, however, does not necessarily use the document generation service. Some tenants use only the cloud platform service. To the contrary, some tenants use only the document generation service. In such situations, in terms of security, each of the cloud platform service and the document generation service should not hold the tenant information in synchronism with the other. With respect to a tenant which performs SSO, however, if it is impossible to discriminate a tenant of the self service corresponding to a tenant of the other service which accesses the self service, it is necessary to enable an authentication apparatus to perform authentication again to determine the tenant. In this case, the user has to input tenant information again for authentication, thereby disabling SSO.

SUMMARY OF THE INVENTION

According to one aspect of the present invention, there is provided a system in which a first service providing apparatus, a second service providing apparatus, a relay apparatus, and at least one authentication apparatus cooperate with each other to provide a service by single sign-on to be used by a user through a browser of a client terminal, the second service providing apparatus comprising a management unit configured to manage belonging information for specifying a group to which the user belongs, and a transmission unit configured to transmit to the client terminal, when an instruction to provide a service by the first service providing apparatus is accepted from the user while providing a service by the second service providing apparatus, information for accessing the first service providing apparatus and the belonging information if the management unit manages the belonging information of the group to which the user belongs, the first service providing apparatus comprising a request unit configured to request, if authentication of access from the client terminal based on the information for accessing is not complete, the relay apparatus to execute authentication processing by the authentication apparatus, a providing unit configured to provide the service according to a result of the authentication processing by the authentication apparatus, a first determination unit configured to determine whether the client terminal could acquire the belonging information from the second service providing apparatus together with the information for accessing the first service providing apparatus in the access from the client terminal that has been authenticated, and an instruction unit configured to cause, if the first determination unit determines that the belonging information could not be acquired from the second service providing apparatus, the management unit of the second service providing apparatus to save belonging information acquired by accepting the belonging information from the user by the relay apparatus, and the relay apparatus comprising a second determination unit configured to determine, when a request is received from the first service providing apparatus, whether the client terminal could acquire the belonging information from the second service providing apparatus together with the information for accessing the first service providing apparatus, an acceptance unit configured to accept, if the second determination unit determines that the belonging information could not be acquired from the second service providing apparatus, belonging information from the user, and an authentication request unit configured to use the belonging information acquired by the client terminal from the second service providing apparatus or the belonging information accepted by the acceptance unit to request authentication processing of one of the at least one authentication apparatus associated with the belonging information.

According to another aspect of the present invention, there is provided a system in which a first service providing apparatus, a second service providing apparatus, a relay apparatus, and at least one authentication apparatus cooperate with each other to provide a service by single sign-on to be used by a user through a browser of a client terminal, the second service providing apparatus comprising a providing unit configured to provide, when providing a service by the second service providing apparatus, a screen for accepting an instruction to provide a service by the first service providing apparatus and a program to be executed by the client terminal upon accepting the instruction, the first service providing apparatus comprising a request unit configured to request, if authentication of access from the client terminal performed by executing the program is not complete, the relay apparatus to execute authentication processing by the authentication apparatus, a providing unit configured to provide the service according to a result of the authentication processing by the authentication apparatus, a first determination unit configured to determine whether belonging information for specifying a group to which the user belongs could be acquired from the client terminal in the access from the client terminal that has been authenticated, an update unit configured to acquire, if the first determination unit determines that the belonging information could not be acquired, the program from the second service providing apparatus, and to update the program to transmit to the first service providing apparatus, when the program is executed, belonging information acquired by accepting the belonging information from the user by the relay apparatus, and an instruction unit configured to cause, when providing a program from then on, the providing unit of the second service providing apparatus to provide the client terminal with the program updated by the update unit, and the relay apparatus comprising a second determination unit configured to determine, when a request is received from the first service providing apparatus, whether the first service providing apparatus could acquire the belonging information from the client terminal, an acceptance unit configured to accept, if the second determination unit determines that the belonging information could not be acquired, belonging information from the user, and an authentication request unit configured to use the belonging information acquired from the client terminal or the belonging information accepted by the acceptance unit to request authentication processing of one of the at least one authentication apparatus associated with the belonging information.

According to another aspect of the present invention, there is provided a first service providing apparatus of a system in which the first service providing apparatus, a second service providing apparatus, a relay apparatus, and at least one authentication apparatus cooperate with each other to provide a service by single sign-on to be used by a user through a browser of a client terminal, the first service providing apparatus comprising: a request unit configured to request, if authentication of access from the client terminal based on information for accessing the first service providing apparatus, that is provided by the second service providing apparatus, is not complete, the relay apparatus to execute authentication processing by the authentication apparatus; a providing unit configured to provide the service according to a result of the authentication processing by the authentication apparatus; a determination unit configured to determine whether the client terminal could acquire belonging information from the second service providing apparatus together with the information for accessing the first service providing apparatus in the access from the client terminal that has been authenticated; and an instruction unit configured to cause, if the determination unit determines that the belonging information could not be acquired from the second service providing apparatus, the second service providing apparatus to save belonging information acquired by accepting the belonging information from the user by the relay apparatus.

According to another aspect of the present invention, there is provided a second service providing apparatus of a system in which a first service providing apparatus, the second service providing apparatus, a relay apparatus, and at least one authentication apparatus cooperate with each other to provide a service by single sign-on to be used by a user through a browser of a client terminal, the second service providing apparatus comprising: a management unit configured to manage belonging information for specifying a group to which the user belongs; and a transmission unit configured to transmit to the client terminal, when an instruction to provide a service by the first service providing apparatus is accepted from the user while providing a service by the second service providing apparatus, information for accessing the first service providing apparatus and the belonging information if the management unit manages the belonging information of the group to which the user belongs, wherein the management unit saves belonging information acquired from the first service providing apparatus in response to an instruction by the first service providing apparatus.

According to another aspect of the present invention, there is provided a relay apparatus of a system in which a first service providing apparatus, a second service providing apparatus, the relay apparatus, and at least one authentication apparatus cooperate with each other to provide a service by single sign-on to be used by a user through a browser of a client terminal, the relay apparatus comprising: a determination unit configured to determine, when a request is received from the first service providing apparatus, whether the client terminal could acquire belonging information for specifying a group to which the user belongs from the second service providing apparatus together with information for accessing the first service providing apparatus; an acceptance unit configured to accept, if the determination unit determines that the belonging information could not be acquired from the second service providing apparatus, belonging information from the user, and an authentication request unit configured to use the belonging information acquired by the client terminal from the second service providing apparatus or the belonging information accepted by the acceptance unit to request authentication processing of one of the at least one authentication apparatus associated with the belonging information.

According to another aspect of the present invention, there is provided a control method for a system in which a first service providing apparatus, a second service providing apparatus, a relay apparatus, and at least one authentication apparatus cooperate with each other to provide a service by single sign-on to be used by a user through a browser of a client terminal, the method comprising in the second service providing apparatus, a management step of managing belonging information for specifying a group to which the user belongs, and a transmission step of transmitting to the client terminal, when an instruction to provide a service by the first service providing apparatus is accepted from the user while providing a service by the second service providing apparatus, information for accessing the first service providing apparatus and the belonging information if the belonging information of the group to which the user belongs is managed in the management step, in the first service providing apparatus, a request step of requesting, if authentication of access from the client terminal based on the information for accessing is not complete, the relay apparatus to execute authentication processing by the authentication apparatus, a providing step of providing the service according to a result of the authentication processing by the authentication apparatus, a first determination step of determining whether the client terminal could acquire the belonging information from the second service providing apparatus together with the information for accessing the first service providing apparatus in the access from the client terminal that has been authenticated, and an instruction step of saving, if it is determined in the first determination step that the belonging information could not be acquired from the second service providing apparatus, belonging information acquired by accepting the belonging information from the user by the relay apparatus in the management step of the second service providing apparatus, and in the relay apparatus, a second determination step of determining, when a request is received from the first service providing apparatus, whether the client terminal could acquire the belonging information from the second service providing apparatus together with the information for accessing the first service providing apparatus, an acceptance step of accepting, if it is determined in the second determination step that the belonging information could not be acquired from the second service providing apparatus, belonging information from the user, and an authentication request step of using the belonging information acquired by the client terminal from the second service providing apparatus or the belonging information accepted in the acceptance step to request authentication processing of one of the at least one authentication apparatus associated with the belonging information.

According to another aspect of the present invention, there is provided a control method of a system in which a first service providing apparatus, a second service providing apparatus, a relay apparatus, and at least one authentication apparatus cooperate with each other to provide a service by single sign-on to be used by a user through a browser of a client terminal, the method comprising in the second service providing apparatus, a providing step of providing, when providing a service by the second service providing apparatus, a screen for accepting an instruction to provide a service by the first service providing apparatus and a program to be executed by the client terminal upon accepting the instruction, in the first service providing apparatus, a request step of requesting, if authentication of access from the client terminal performed by executing the program is not complete, the relay apparatus to execute authentication processing by the authentication apparatus, a providing step of providing the service according to a result of the authentication processing by the authentication apparatus, a first determination step of determining whether belonging information for specifying a group to which the user belongs could be acquired from the client terminal in the access from the client terminal that has been authenticated, an update step of acquiring, if it is determined in the first determination step that the belonging information could not be acquired, the program from the second service providing apparatus, and updating the program to transmit to the first service providing apparatus, when the program is executed, belonging information acquired by accepting the belonging information from the user by the relay apparatus, and an instruction step of providing, when providing a program from then on in the providing step of the second service providing apparatus, the client terminal with the program updated in the update step, and in the relay apparatus, a second determination step of determining, when a request is received from the first service providing apparatus, whether the first service providing apparatus could acquire the belonging information from the client terminal, an acceptance step of accepting, if it is determined in the second determination step that the belonging information could not be acquired, belonging information from the user, and an authentication request step of using the belonging information acquired from the client terminal or the belonging information accepted in the acceptance step to request authentication processing of one of the at least one authentication apparatus associated with the belonging information.

According to another aspect of the present invention, there is provided a computer-readable medium storing a program for causing a computer to function as a determination unit configured to determine whether a client terminal could acquire belonging information of a group to which a user belongs from another computer together with information for accessing the computer in access from the client terminal that has been authenticated, and an instruction unit configured to cause, if the determination unit determines that the belonging information could not be acquired from the other computer, the other computer to save belonging information acquired by a user input.

According to one aspect of the present invention, there is provided a computer-readable medium storing a program for causing a computer to function as a management unit configured to manage belonging information for specifying a group to which a user belongs, and a transmission unit configured to transmit to a client terminal used by the user, when an instruction to provide a service by another computer is accepted from the user while providing a service by the computer, information for accessing the other computer and the belonging information of the group to which the user belongs if the management unit manages the belonging information, wherein the management unit saves belonging information acquired from the other computer in response to an instruction by the other computer.

According to one aspect of the present invention, there is provided a computer-readable medium storing a program for causing a computer to function as a determination unit configured to determine, when a request for authentication processing by an authentication unit is received from a first service providing apparatus, whether a client terminal that is provided with a service by the first service providing apparatus could acquire belonging information for specifying a group to which a user belongs from a second service providing apparatus together with information for accessing the first service providing apparatus, an acceptance unit configured to accept, if the determination unit determines that the belonging information could not be acquired from the second service providing apparatus, belonging information from the user, and an authentication request unit configured to use the belonging information acquired from the second service providing apparatus or the belonging information accepted by the acceptance unit to request the authentication unit associated with the belonging information to authenticate the client terminal.

According to the present invention, by prompting the user to input tenant information only once, and using the input tenant information thereafter, it is possible to perform SSO without inputting the tenant information again.

Further features of the present invention will become apparent from the following description of exemplary embodiments (with reference to the attached drawings).

BRIEF DESCRIPTION OF THE DRAWINGS

FIGS. 3A, 3B, and 3C are block diagrams each showing an example of a module configuration;

FIG. 6 is a table showing an example of the structure of information managed by a management module;

FIG. 7 is a view showing an example of a screen which displays business data for service providing service B;

FIGS. 8A, 8B, and 8C are views showing examples of various input screens;

FIG. 9 is a view showing an example of the description of button settings according to the first embodiment;

FIG. 14 is a flowchart illustrating a procedure executed by authentication service B to achieve SSO;

FIG. 17 is a flowchart illustrating a procedure executed by service providing service B;

FIG. 19 is a view showing an example of the description of button settings according to the second embodiment;

FIG. 24 is a view showing an example of the description of button settings according to the third embodiment; and FIG. 25 is a flowchart illustrating a procedure executed by service providing service A according to the third embodiment.

DESCRIPTION OF THE EMBODIMENTS

According to the present invention, an SSO system in which services cooperate with each other to perform authentication causes a user to input tenant information (a company ID) only once, and does not display an input screen for the tenant information thereafter.

First Embodiment

System Configuration

Figure 1:
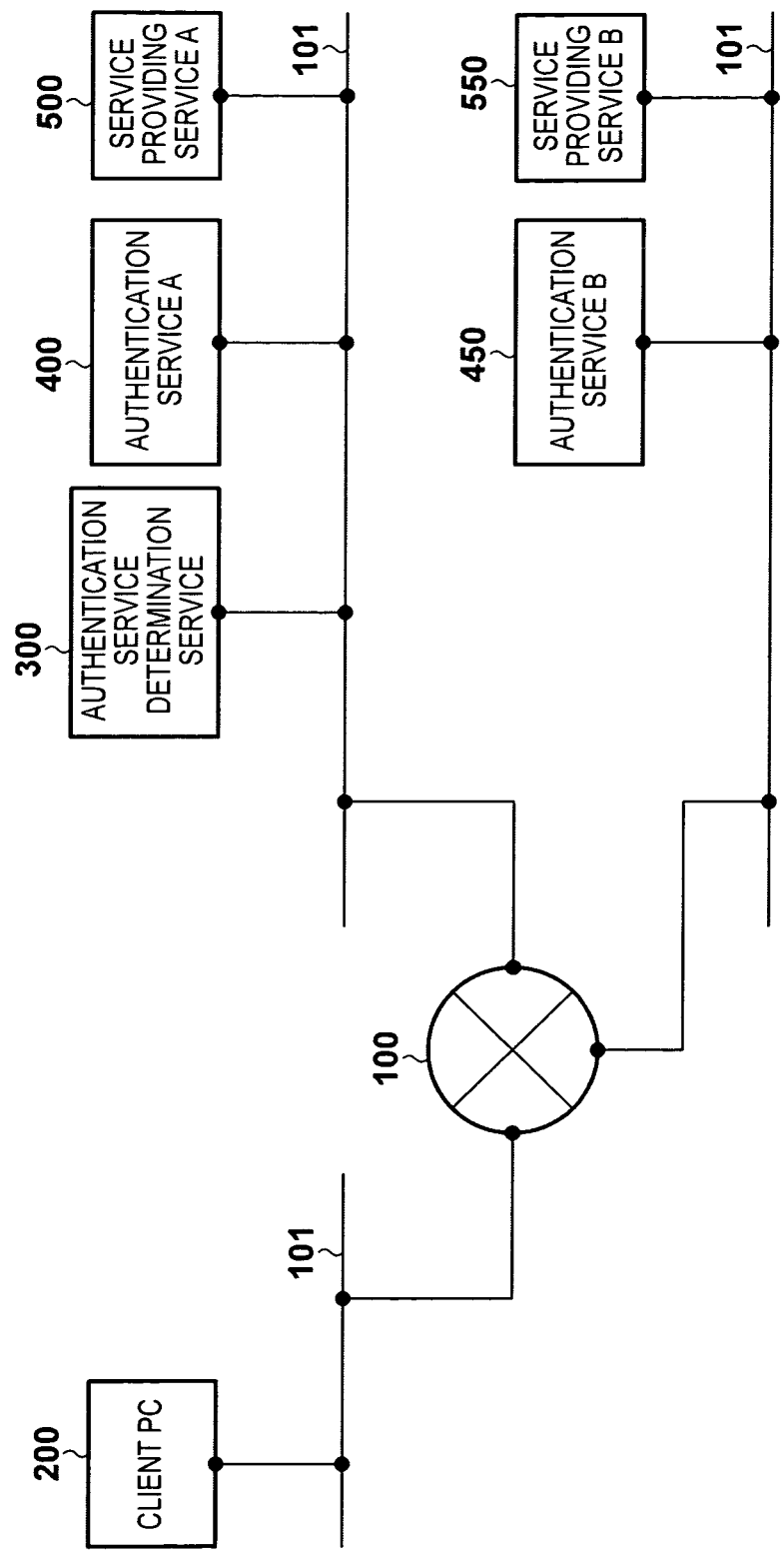
FIG. 1 is a block diagram showing a network configuration.

An embodiment for implementing the present invention will be described below with reference to the accompanying drawings. FIG. 1 is a block diagram showing a system configuration according to the embodiment of the present invention. In a WAN (Wide Area Network) 100, a WWW (World Wide Web) system has been constructed. A LAN (Local Area Network) 101 connects each component. The apparatuses connected to the LAN 101 can communicate with each other via the WAN 100.

A client PC 200 operated by the user has a browser (not shown). The client PC issues a request to a service providing service A 500 (a first service providing apparatus) or a service providing service B 550 (a second service providing apparatus) (to be described later). An authentication service determination service 300 serves as a relay apparatus which guides user access to an appropriate one of at least one IdP (identity provider apparatus) connected to a network. Each of an authentication service A 400 and authentication service B 450 performs authentication, and serves as an IdP. Note that the number of authentication services is not limited to two. An IdP which actually performs authentication is different for each user who accesses the service.

The service providing service A 500 and service providing service B 550 provide various services for the user who has been successfully authenticated by the authentication service. In this embodiment, the service providing service A 500 receives a request from the client PC 200, and generates a document (a document generation service). Furthermore, the service providing service B 550, for example, displays or updates data held in itself in response to a request from the client PC 200 or service providing service A 500 (a cloud platform service). Note that the service providing service A 500 and service providing service B 550 are not limited to the document generation service and cloud platform service, respectively, and may be other services.

The client PC 200, authentication service determination service 300, authentication service A 400, authentication service B 450, service providing service A 500, and service providing service B 550 are connected via the WAN 100 and LAN 101. Note that the client PC 200 and the respective services may be arranged on separate LANs or one LAN. The respective services may be provided in one apparatus. The authentication service determination service 300, authentication service A 400, and service providing service A 500 are a group of servers constructed within one network (intranet). Furthermore, the authentication service B 450 and service providing service B 550 are a group of services constructed within one network (intranet).

To use a service, the client PC 200 first accesses the service providing service B 550. Upon accepting the access from the unauthenticated user, the service providing service B 550 displays an authentication screen (not shown) to perform user authentication. Upon authenticating the user, the service providing service B 550 provides the client PC 200 with data for displaying business data. The client PC 200 then displays the provided data. In this embodiment, to display the data, the browser of the client PC 200 can be used.

FIG. 7 shows an example of a screen 701 for the business data that is provided by the service providing service B 550 according to the embodiment. The screen 701 for the business data includes, for example, a "business meeting" tab and a "customer" tab. In FIG. 7, the "business meeting" tab is displayed in an active state, in which detailed information and a product of one business meeting record are displayed.

Furthermore, a button 702 which has been set to redirect access to the service providing service A 500 is displayed. It is possible to arbitrarily set, for the button 702, an operation to be executed upon press of the button, a tab (screen) on which the button is to be displayed, and the like, and the user (administrator) can arrange the button 702 on the screen. When the button 702 is pressed, the client PC 200 redirects the access to the service providing service A 500. That is, the client PC 200 can instruct a service to be provided by the service providing service A 500 in cooperation with the service provided by the service providing service B 550. A function that is executed by pressing the button 702 will be described later with reference to FIG. 9 and the like.

Upon accepting the access from the unauthenticated user through the client PC 200, the service providing service A 500 redirects the access to the authentication service determination service 300. It is assumed that whether the user who has accessed is unauthenticated is determined based on information (for example, information exchanged in SSO) acquirable by the service providing service A 500 in the access, and a detailed description thereof will be omitted. The authentication service determination service 300 redirects the unauthenticated access to the appropriate authentication service A 400 or authentication service B 450. Upon performing user authentication, the authentication service A 400 or authentication service B 450 redirects the user access to the service providing service A 500 again, which then provides the service for the user.

Figure 2:
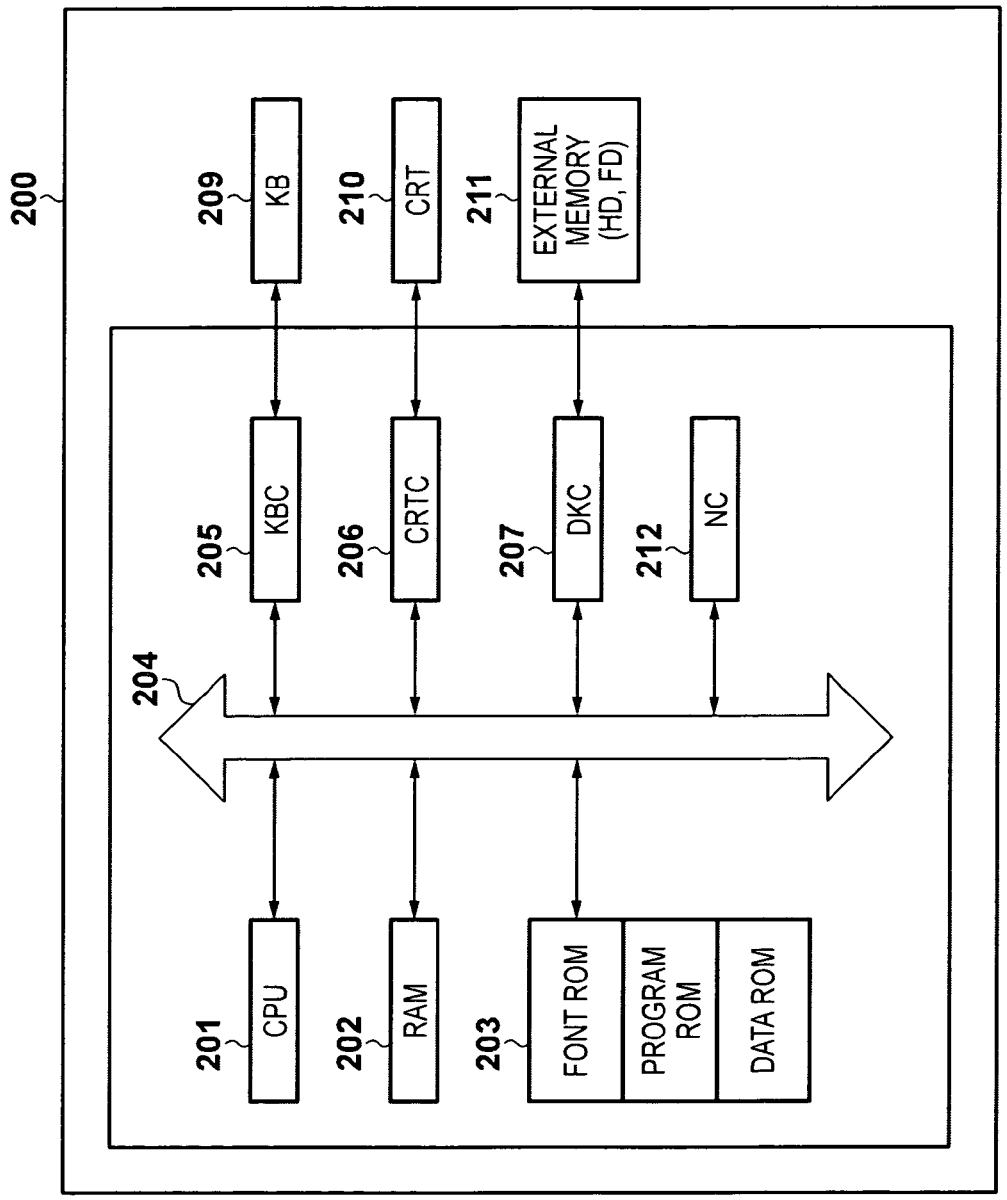
FIG. 2 is a block diagram showing a hardware configuration.

FIG. 2 is a block diagram showing the configuration of the client PC 200 according to the embodiment. A server computer which provides the authentication service determination service 300, authentication service A 400, authentication service B 450, service providing service A 500, or service providing service B 550 also has the same configuration. These services are implemented as servers, which have the configuration shown in the hardware block diagram of FIG. 2. As described above, the hardware configuration of a general information processing apparatus is applicable to the client PC 200 and servers in this embodiment.

Referring to FIG. 2, a CPU 201 executes programs such as an OS and applications stored in the program ROM of a ROM 203 or loaded from a hard disk 211 into a RAM 202. Note that an OS is an abbreviation for an operating system running on a computer. The operating system will be referred to as an OS hereinafter. Processing shown in each flowchart (to be described later) is implemented by executing the programs.

The RAM 202 functions as a main memory, a work area or the like for the CPU 201. A keyboard controller (KBC) 205 controls key inputs through a keyboard (KB) 209 and a pointing device (not shown). A CRT controller (CRTC) 206 controls display of a CRT display 210. A disk controller (DKC) 207 controls data access to the hard disk (HD) 211, a Floppy® disk (FD), or the like storing various data. An NC 212 is connected to a network, and executes communication control processing with other apparatuses connected to the network.

Note that throughout the following description, the CPU 201 predominates processing by hardware, and an application program installed in the hard disk (HDD) 211 predominates processing by software, unless otherwise specified.

[Module Configuration]
Modules forming each service according to this embodiment will be described below.
(Module Configuration of Authentication Service)
FIGS. 3A to 3C are block diagrams each showing a module configuration according to the embodiment. FIG. 3A shows the authentication service determination service 300. FIG. 3B shows the authentication service A 400. FIG. 3C shows the authentication service B 450. Although the above two authentication services both serve as IdPs, the number of IdPs may be one. It is possible to implement the present invention as long as at least one IdP exists. In the first embodiment, the authentication service determination service 300, authentication service A 400, and service providing service A 500 serve as SPs. Each SP cooperates with the IdP to perform single sign-on.

FIG. 3A is a block diagram showing an example of the module configuration of the authentication service determination service 300 according to the embodiment. Note that although a company ID is used as the group identifier of the user in this example, the present invention is not limited to this. The company ID is specific belonging information uniquely assigned to an organization or corporation which uses the system, and is also referred to as a tenant ID. For example, a user or a client terminal used by the user is assumed to belong to one of tenants, thereby uniquely specifying the tenant.

The authentication service determination service 300 includes a management module 301, a first key extraction module 302, a first acquisition module 303, and a first access guide module 304. The authentication service determination service 300 also includes a determination module 305, a request module 306, a second key extraction module 307, a second acquisition module 308, and a second access guide module 309.

The management module 301 stores, in association with each other, a company ID and information of an authentication service which authenticates a user with the company ID. When the authentication service determination service 300 accepts access from an unauthenticated user, the determination module 305 determines whether the parameters of the user access include a company ID.

If a company ID is included, the first key extraction module 302 extracts the company ID serving as a key for determining an authentication service. The first acquisition module 303 uses the extracted company ID to acquire information of the authentication service from the management module 301. The information of the company IDs held by the management module 301 will be described later with reference to FIG. 6. The first access guide module 304 guides the user to access the appropriate authentication service according to the company ID acquired from the management module 301.

If no company ID is included, the request module 306 displays a screen for prompting the user to input a company ID. The second key extraction module 307 extracts the company ID input through the screen presented by the request module 306. The second acquisition module 308 uses the extracted company ID to acquire information of an authentication service from the management module 301. The second access guide module 309 guides, to the appropriate authentication service, the user access to the authentication service determination service 300 according to the extracted information of the authentication service. It is assumed that the authentication service B 450 has established SSO with the authentication service A 400.

FIG. 3B is a block diagram showing an example of the module configuration of the authentication service A 400 according to the embodiment. The authentication service A 400 includes a service A authentication module 401 and an assertion validation module 402.

Upon accepting unauthenticated access, the authentication service A 400 presents, for example, an authentication screen 810 having a configuration shown in FIG. 8B to prompt the user to input a user ID and password, thereby performing authentication. To achieve SSO, when the authentication service A 400 receives an authentication result provided by another authentication service in the user access, the assertion validation module 402 performs validation of the authentication result, and determines whether to permit the user access. Note that although information as the authentication result assumes an SAML assertion in this embodiment, the present invention is not limited to SSO using SAML and an SAML assertion. Note that an assertion indicates authentication information which is issued depending on an authentication result, and exchanged between services.

FIG. 3C is a block diagram showing the module configuration of the authentication service B 450 according to the embodiment. The authentication service B 450 includes a service B authentication module 451 and an assertion issuance module 452. Upon accepting unauthenticated access, the authentication service B 450 presents, for example, an authentication screen 820 having a configuration shown in FIG. 8C to prompt the user who is accessing to input a user ID and password, thereby performing authentication. If authentication succeeds, the assertion issuance module 452 generates an SAML assertion as an authentication result, and redirects the user access to an authentication service which can perform validation of the assertion.

(Module Configuration of Service Providing Service)

Figure 4:
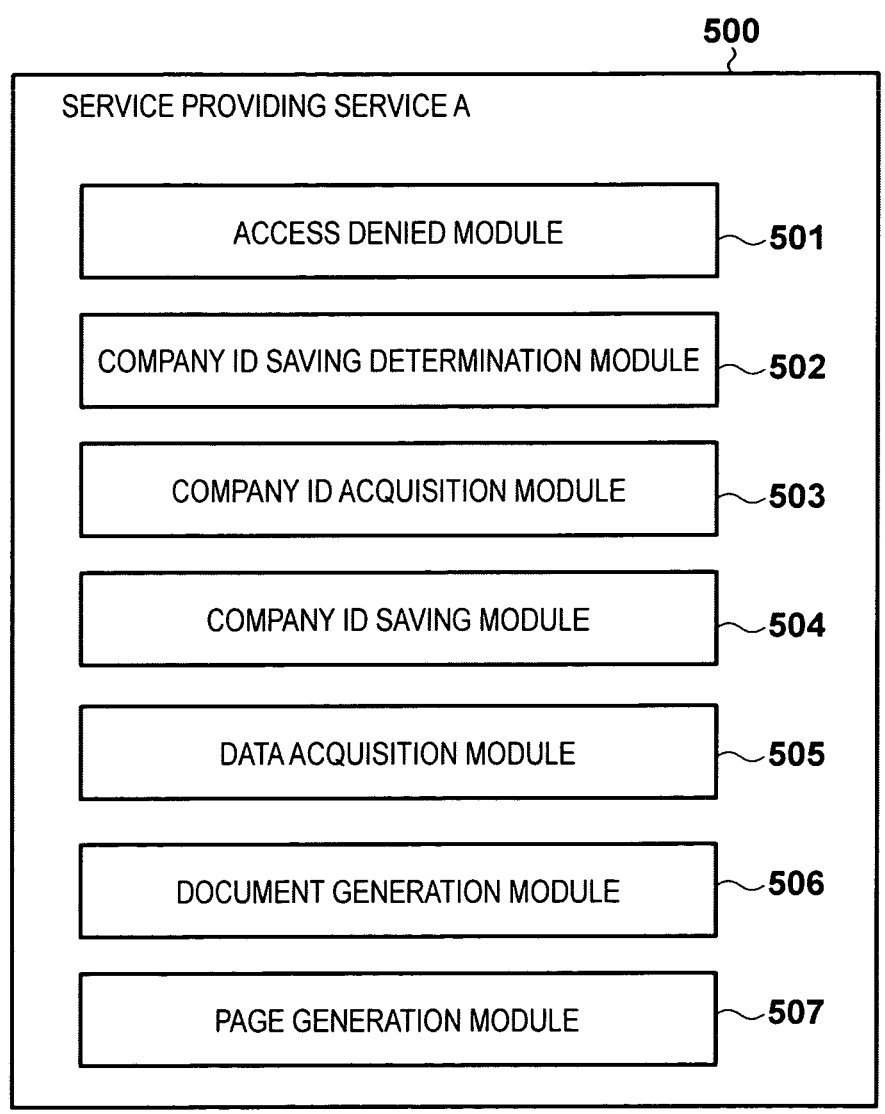
FIG. 4 is a block diagram showing the module configuration of service providing service A according to the first embodiment.

FIG. 4 is a block diagram showing an example of the module configuration of the service providing service A 500 according to the embodiment. The service providing service A 500 includes an access denied module 501, a company ID saving determination module 502, a company ID acquisition module 503, a company ID saving module 504, a data acquisition module 505, a document generation module 506, and a page generation module 507.

Upon accepting the access from the user, the service providing service A 500 causes the access denied module 501 to determine whether the access has been authenticated. It is assumed in this example that whether the access has been authenticated is determined based on information acquirable by the service providing service A 500 in the access, and a detailed description thereof will be omitted. If the access has not been authenticated, the access denied module 501 redirects the access to the authentication service determination service 300. If the access has been authenticated, the service providing service A 500 causes the document generation module 506 to provide a service to the user.

The company ID saving determination module 502 determines whether the URL parameters of the redirect from the authentication service A 400 include a company ID. Note that the URL parameters indicate information obtained by including various kinds of attribute information (setting values) in a URL (Uniform Resource Locator) as the position information of an access destination. If the URL parameters acquired when the user accesses includes no company ID, the company ID acquisition module 503 acquires a company ID in some way, and the company ID saving module 504 saves, in the service providing service B 550, the acquired company ID in association with the user (or a session or the like).

As a method in which the company ID acquisition module 503 acquires a company ID, for example, the authentication service A 400 sets a company ID in an HTTP header, and the company ID acquisition module 503 acquires the company ID from the HTTP header. The data acquisition module 505 acquires business data from the service providing service B 550. The document generation module 506 acquires a form managed by a form management module (not shown), and generates document data based on the acquired form and the business data acquired by the data acquisition module 505. The page generation module 507 generates a response page, and returns it to the client PC 200.

Figure 5:
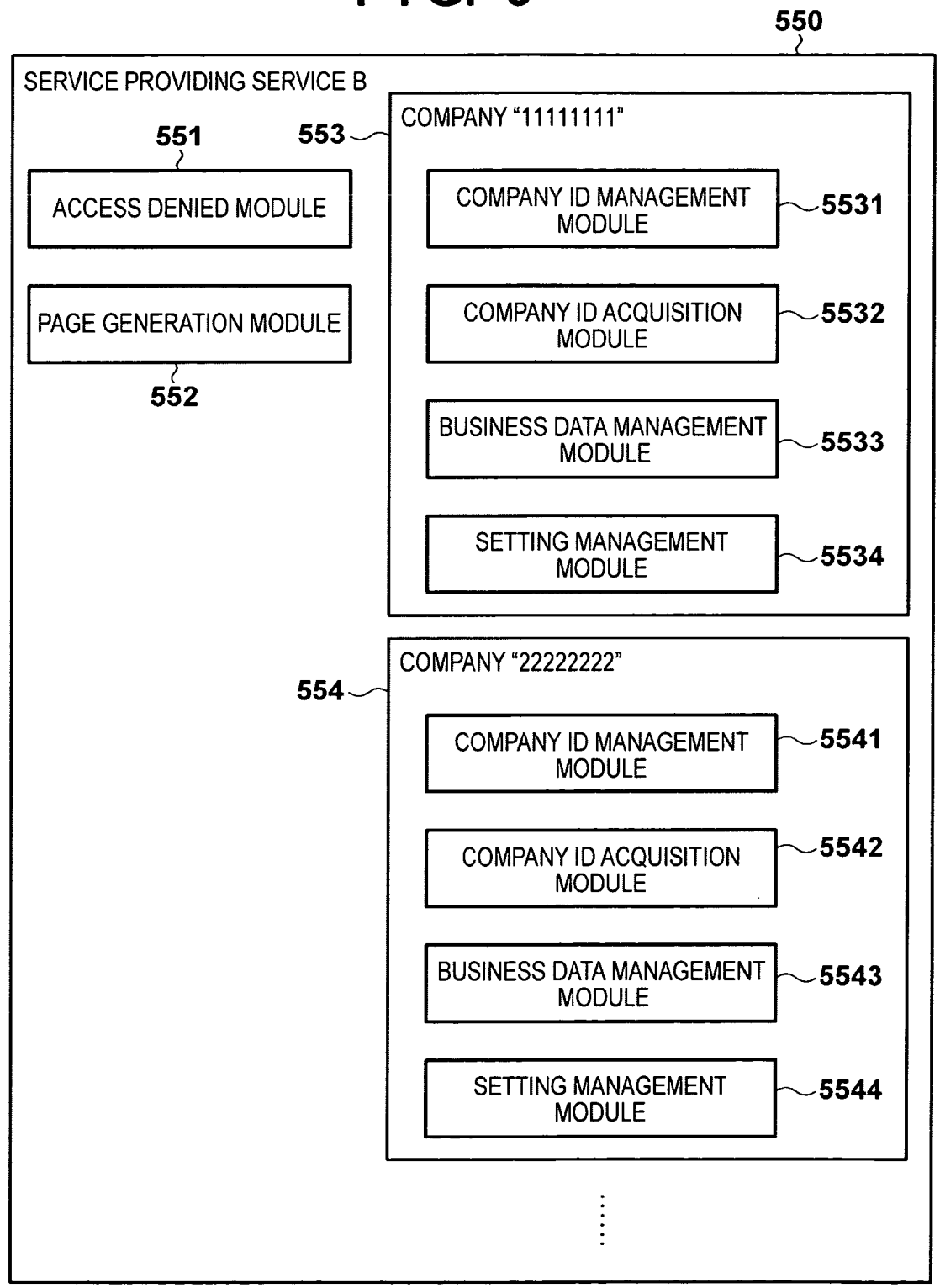
FIG. 5 is a block diagram showing the module configuration of service providing service B.

FIG. 5 is a block diagram showing an example of the module configuration of the service providing service B 550 according to the embodiment. The service providing service B 550 includes an access denied module 551, a company ID management module 5531, a company ID acquisition module 5532, a business data management module 5533, and a setting management module 5534. In the service providing service B 550, a company ID management module, a company ID acquisition module, a business data management module, and a setting management module are provided for each tenant (company or contract). That is, the user uses various modules assigned to a tenant to which he/she belongs. Although one tenant (company "11111111") will be exemplified in the following description, each module operates in response to a request for each tenant. Note that the modules assigned to each tenant may be stored in one hard disk (HD) 211 to manage data for each tenant in a logically separated manner, or may be stored in separate hard disks (HDs) 211 to manage data for each tenant in a physically separated manner.

Upon accepting the access from the user, the service providing service B 550 causes the access denied module 551 to determine whether the access has been authenticated. If the access has not been authenticated, a page generation module 552 displays an authentication screen. If the access has been authenticated, the service providing service B 550 provides a service.

When the service providing service B 550 accepts a request to display business data, the business data management module 5533 acquires the business data. If a screen for displaying the business data includes a button, the setting management module 5534 acquires button settings. The button settings acquired at this time will be described later. The page generation module 552 generates a response page, and returns it to the client PC 200.

FIG. 9 is a view showing an example of the description of the button settings according to the embodiment. For example, the button according to the dfescription is arranged on the screen 701 for the business data shown in FIG. 7. Note that "create document" is set as a display name 901 corresponding to the button 702. As an operation 902 when the button 702 is pressed, it is defined to execute a JavaScript® code on the browser of the client PC 200. Contents 903 of the JavaScript code to be executed are defined in the description example shown in FIG. 9.

Referring to FIG. 9, in a portion in which it is defined to acquire a company ID, the company ID is acquired from the company ID acquisition module 5532 (to be described later). As a method of acquiring the company ID, for example, a Web service API for acquiring a company ID is publicized, and the client PC side calls the Web service API.

In FIG. 9, {!$Api.Session_ID} indicates acquisition of the session ID of the authenticated user from the session management module (not shown) of the service providing service B 550. In FIG. 9, {!$Api.Server_URL} indicates acquisition of a URL for accessing the service providing service B 550. In FIG. 9, {!Opportunity.Id} indicates acquisition of the record ID of the business meeting record displayed on the screen.

Upon press of the button 702 set as shown in FIG. 9, the JavaScript code is executed on the browser of the client PC 200, and another window is displayed to redirect the access to "http://service_a/service". Assume that "http://service_a/service" indicates the URL of the service providing service A 500. In addition to the URL, "TENANT_ID", "sessionid", "serverurl", and "recordid" are included as the URL parameters of the redirect. The parameter "TENANT_ID" indicates a company ID. The parameter "sessionid" indicates the session ID of an authenticated user. The parameter "serverurl" indicates a URL for accessing the service providing service B 550. The parameter "recordid" indicates the record ID of a business meeting record. Note that in this embodiment, a company ID included in the URL parameters indicates the value of the parameter "TENANT_ID", unless otherwise specified.

When the service providing service B 550 accepts a request to save a company ID, the company ID management module 5531 saves it in a storage unit. Each tenant generally has one company ID saved by the company ID management module. The present invention is not limited to this, and a plurality of company IDs may be saved. When the service providing service B 550 accepts a company ID acquisition request, the company ID acquisition module 5532 acquires a company ID from the company ID management module 5531, and returns it. The company ID acquisition module 5532 is publicized as, for example, a Web service API, so that it is possible to accept a company ID acquisition request from the browser of the client PC 200.

[Processing Procedure]

Processing which the respective services cooperate to execute will be described below. Note that the processing will be explained according to the procedure of cooperation between the services.

(Processing in Client PC)

Figure 10:
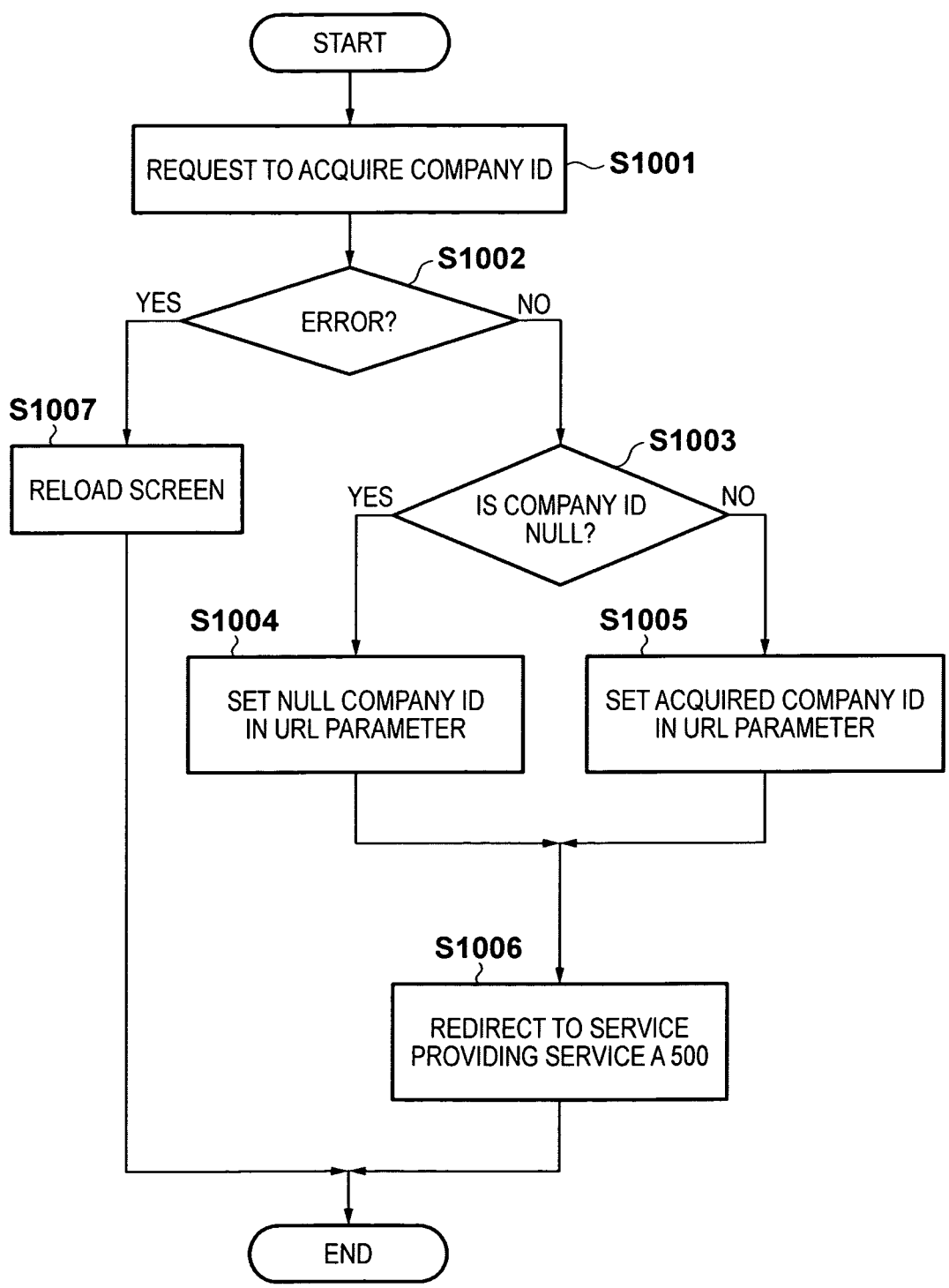
FIG. 10 is a flowchart illustrating a procedure executed by the browser of a client PC.

FIG. 10 shows a procedure executed by the browser of the client PC 200 according to the embodiment. The procedure starts when the user presses the button 702 on the screen 701 for business data shown in FIG. 7, which is displayed on the browser of the client PC 200. Upon press of the button 702, the browser executes the JavaScript code set for the button 702, thereby performing this procedure. This processing starts based on the premise that the user has logged into the service providing service B 550 and a session ID has been issued by the service providing service B 550. Assume also that the user has logged into the company "11111111" shown in FIG. 5 as a target.

In step S1001, the browser of the client PC 200 sends a request to acquire a company ID from the service providing service B 550. In step S1002, the browser of the client PC 200 determines whether the company ID acquisition processing has ended without any error. If the processing has ended without any error (NO in step S1002), the process advances to step S1003; otherwise (YES in step S1002), the process advances to step S1007.

In step S1003, the browser of the client PC 200 determines whether the company ID acquired from the service providing service B 550 is null. If the acquired company ID is null (YES in step S1003), the browser sets a null company ID in the URL parameter in step S1004. If the acquired company ID is not null (NO in step S1003), the browser sets the acquired company ID in the URL parameter in step S1005. After the processing in step S1004 or S1005, the browser of the client PC 200 accesses the service providing service A 500 in step S1006. Note that the URL ("http://service_a/service" in this case) of the service providing service A 500 has been set as the URL parameter.

In step S1007, the browser reloads the screen. If, for example, the session of the authenticated user is disconnected in the service providing service B 550, an error occurs in step S1002. In this case, the browser redisplays the authentication screen by reloading the screen, and can return to the immediately preceding screen after authentication succeeds. Note that the browser may display an error screen without reloading the screen in step S1007. Then, the procedure executed by the browser of the client PC 200 ends.

(Processing in Service Providing Service B)

Figure 11:
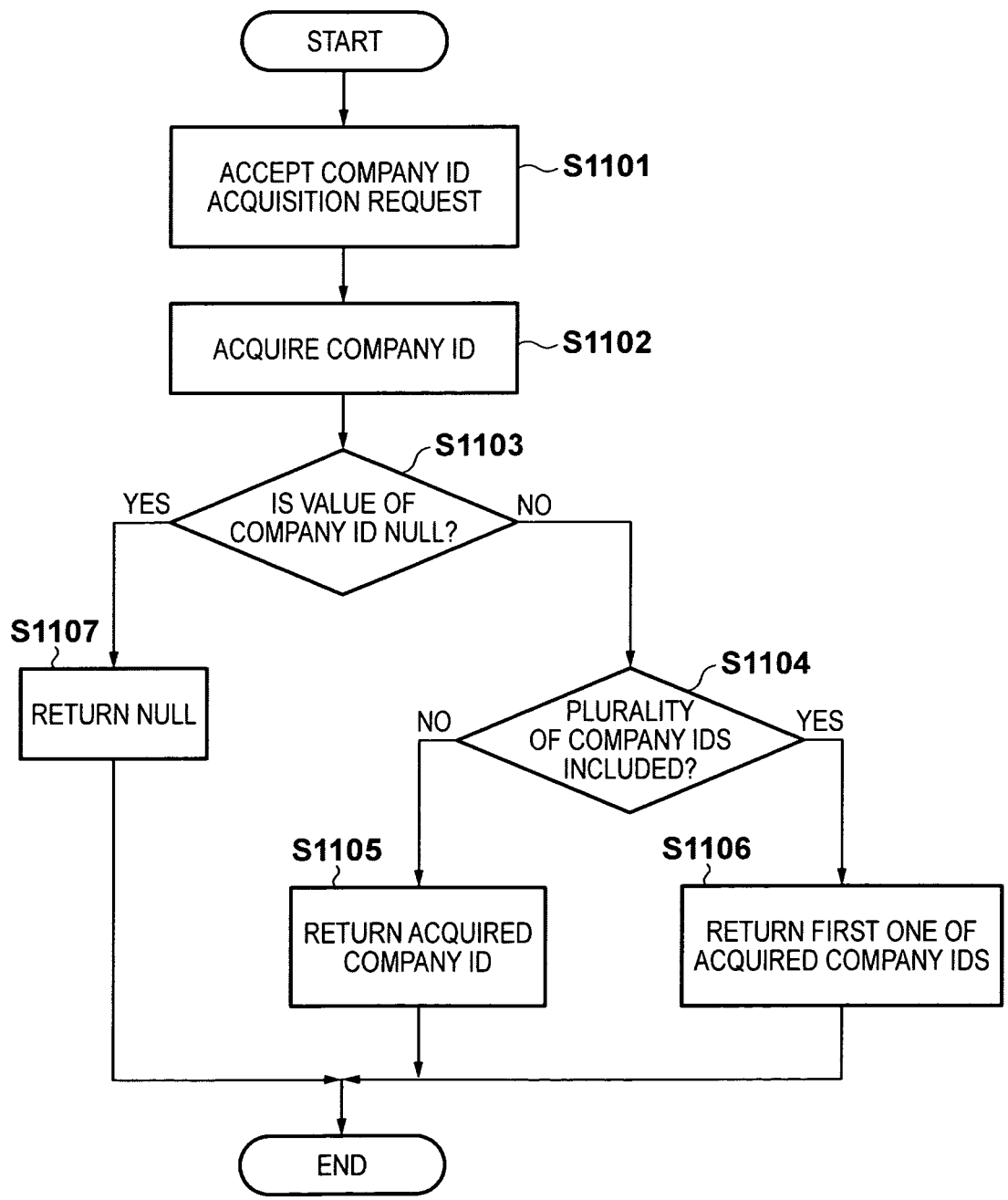
FIG. 11 is a flowchart illustrating a procedure executed by service providing service B.

FIG. 11 shows a procedure executed by the service providing service B 550 according to the embodiment. The procedure starts when the browser of the client PC 200 sends the company ID acquisition request to the service providing service B 550 in step S1001 of FIG. 10.

In step S1101, the service providing service B 550 accepts the company ID acquisition request from the client PC 200. In step S1102, the company ID acquisition module 5532 acquires the company ID from the company ID management module 5531. In step S1103, the company ID acquisition module 5532 determines whether the value of the acquired company ID is null. If it is determined that the value of the company ID is null (YES in step S1103), the process advances to step S1107; otherwise (NO in step S1103), the process advances to step S1104. Note that a null company ID indicates that the company ID management module does not hold the requested company ID associated with the user or client PC at this time.

In step S1104, the company ID acquisition module 5532 determines whether a plurality of company IDs are included. If it is determined that one company ID is included (NO in step S1104), the process advances to step S1105. If it is determined that a plurality of company IDs are included (YES in step S1104), the process advances to step S1106. In step S1105, the company ID acquisition module 5532 returns, as a response, the acquired company ID to the client PC 200. In step S1106, the company ID acquisition module 5532 returns, as a response, the first one of the acquired company IDs to the client PC 200. Note that in step S1106, the acquired company IDs are acquired from the company ID management module 5531 in a saving order. The acquisition order, however, is not limited to this, and the company IDs may be ordered according to other criteria.

In step S1107, the company ID acquisition module 5532 returns, as a response, information indicating that the company ID is null to the client PC 200. Then, the procedure ends.

(Processing in Service Providing Service A)

Figure 12:
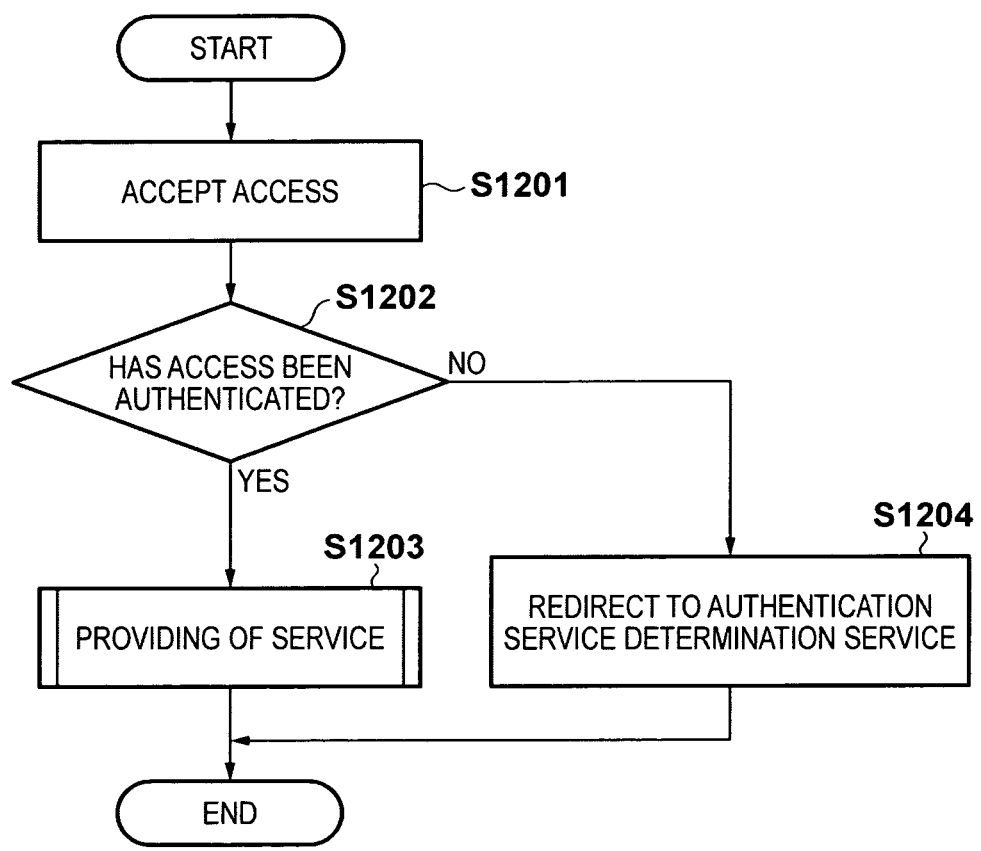
FIG. 12 is a flowchart illustrating a procedure executed by service providing service A.

FIG. 12 shows a procedure executed by the service providing service A 500 according to the embodiment. The procedure starts when the user accesses the service providing service A 500 as a result of redirecting the access in step S1006 of FIG. 10.

In step S1201, the service providing service A 500 accepts the user access. In step S1202, the access denied module 501 determines whether the access accepted in step S201 has been authenticated. If the access has been authenticated (YES in step S1202), the process advances to step S1203; otherwise (NO in step S1202), the process advances to step S1204. It is assumed that whether the access has been authenticated is determined based on information (for example, information exchanged in SSO) acquirable by the service providing service A 500 in the access, and a detailed description thereof will be omitted.

In step S1203, the service providing service A 500 provides the service, and ends the procedure. The processing of providing the service in step S1203 will be described in detail later with reference to FIG. 16. In step S1204, the access denied module 501 redirects, to the authentication service determination service 300, the access which has been determined to be unauthenticated in step S1202. At this time, the service providing service A 500 adds information for accessing itself after completion of authentication processing. The information in this case corresponds to the URL of the service providing service A 500 or the like. After the information is added and a redirect is done, the procedure ends.

(Processing in Authentication Service Determination Service)

Figure 13:
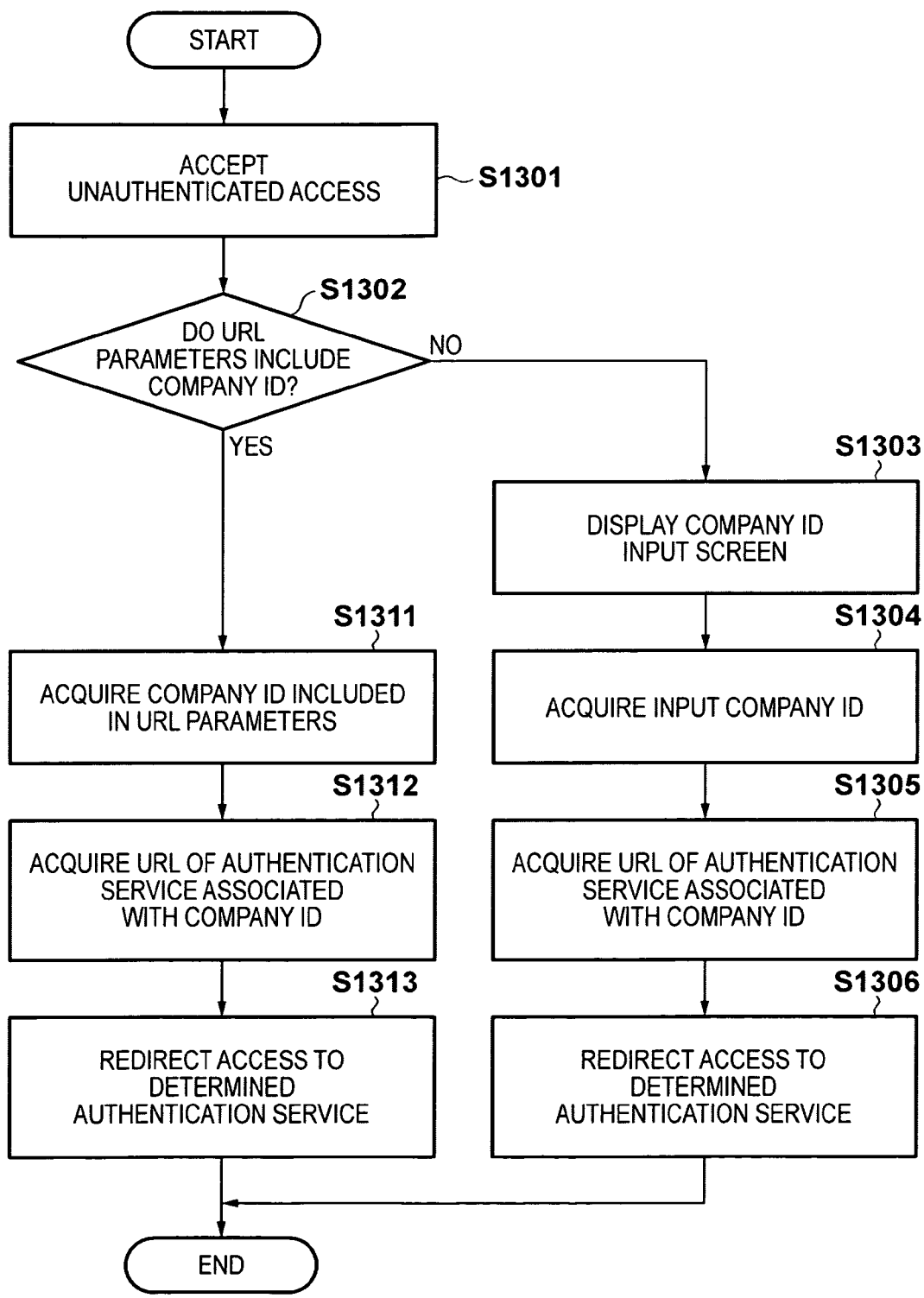
FIG. 13 is a flowchart illustrating a procedure executed by an authentication service determination service.

FIG. 13 shows a procedure executed by the authentication service determination service 300 according to the embodiment. The procedure starts when the user directly accesses the authentication service determination service 300, or the service providing service A 500 redirects the user access to the authentication service determination service 300 (step S1204 of FIG. 12).

In step S1301, the authentication service determination service 300 accepts the unauthenticated user access. In step S1302, the determination module 305 determines whether the URL parameters of the unauthenticated user access include a company ID (second determination). If it is determined that a company ID is included (YES in step S1302), the process advances to step S1311; otherwise (NO in step S1302), the process advances to step S1303.

In step S1303, the request module 306 displays a company ID input screen 800 shown in FIG. 8A. This screen implements an acceptance unit for a company ID. In step S1304, the second key extraction module 307 extracts a company ID input through the company ID input screen 800 by the user. In step S1305, the second acquisition module 308 uses the company ID acquired in step S1304 to acquire information of an authentication service associated with the company ID from the management module 301. If, for example, the company ID extracted in step S1304 is "11111111", the acquired information of the authentication service is the URL "http://service_b/?sp=http%3A%2F%2Fservice_a%2F" of the authentication service B 450, as shown in a list 601 of FIG. 6. In the example of the URL used by the authentication service determination service 300, it is assumed that the authentication service B 450 and authentication service A 400 perform SSO.

In step S1306, the second access guide module 309 redirects the unauthenticated user access according to the information of the authentication service acquired in step S1305. If the authentication service determination service 300 has received access destination information after completion of authentication in step S1301, the second access guide module 309 adds the access destination information to perform a redirect. At this time, the acquired company ID is not added as the parameter "TENANT_ID" of the access destination information. In this embodiment, the acquired company ID is added to the HTTP header to perform a redirect.

In step S1311, the first key extraction module 302 extracts a company ID from the URL parameters of the unauthenticated user access. In step S1312, the first acquisition module 303 uses the company ID acquired in step S1311 to acquire information of an authentication service associated with the company ID from the management module 301. If, for example, the company ID extracted in step S1311 is "11111111", the acquired information of the authentication service is the URL "http://service_b/?sp=http%3A%2F%2Fservice_a%2F" of the authentication service B 450, as shown in the list 601 of FIG. 6. In the example of the URL used by the authentication service determination service 300, it is assumed that the authentication service B 450 and authentication service A 400 perform SSO.

In step S1313, the first access guide module 304 redirects the authenticated user access according to the information of the authentication service acquired in step S1312. If the authentication service determination service 300 has received access destination information after completion of authentication in step S1301, the first access guide module 304 adds the access destination information to perform a redirect. Upon completion of the redirect, the procedure ends.

FIG. 8A shows the company ID input screen 800 according to the embodiment. The user can input, through the screen, the company ID of a company to which he/she belongs. With the processing in step S1306 or S1313, authentication is requested to each authentication service.

(Processing in Authentication Service B)

FIG. 14 shows a procedure executed by the authentication service B 450 to achieve SSO according to the embodiment. The procedure starts when the authentication service determination service 300 redirects the user access to the authentication service B 450, as shown in FIG. 13.

In step S1401, the authentication service B 450 accepts the authentication request redirected by the authentication service determination service 300. Furthermore, the authentication service B 450 acquires, from the URL parameters, redirect destination information when authentication succeeds. In this example, a portion of "?sp=http%3A%2F%2Fservice_a%2F" represents a redirect destination. In step S1402, the service B authentication module 451 displays the authentication screen 820 shown in FIG. 8C. In step S1403, the service B authentication module 451 checks whether authentication information input through the authentication screen 820 is correct. If the authentication information is correct (YES in step S1403), the process advances to step S1404; otherwise (NO in step S1403), the process advances to step S1405.

In step S1404, the assertion issuance module 452 issues an assertion corresponding to the authentication information which has been determined to be correct in step S1403. Note that an assertion will also be referred to as a "credential" hereinafter. If the assertion is issued, the authentication service B 450 redirects the user access to a URL as the redirect destination information acquired in step S1401. If the authentication service B 450 has received access destination information after completion of authentication in step S1401, it adds the access destination information (the URL of the service providing service A 500 in this example) to redirect the access to the authentication service A 400. Upon completion of the redirect, the procedure ends.

In step S1405, the service B authentication module 451 displays a screen for notifying the user that authentication has failed because the authentication information input through the authentication screen 820 is incorrect, thereby terminating the procedure. At this time, the client PC 200 displays the authentication failure screen transmitted from the service B authentication module 451. This screen may be a screen for advancing to step S1402 again to accept authentication information from the user, or a screen for only indicating that authentication has failed. The present invention is not limited to them.

Only the assertion is issued in step S1404 and, therefore, the user access has not been authenticated yet at this time. Even if the user continuously tries to access the service providing service A 500, he/she cannot access. Thus, the authentication service A 400 executes a procedure shown in FIG. 15.

(Processing in Authentication Service A)

Figure 15:
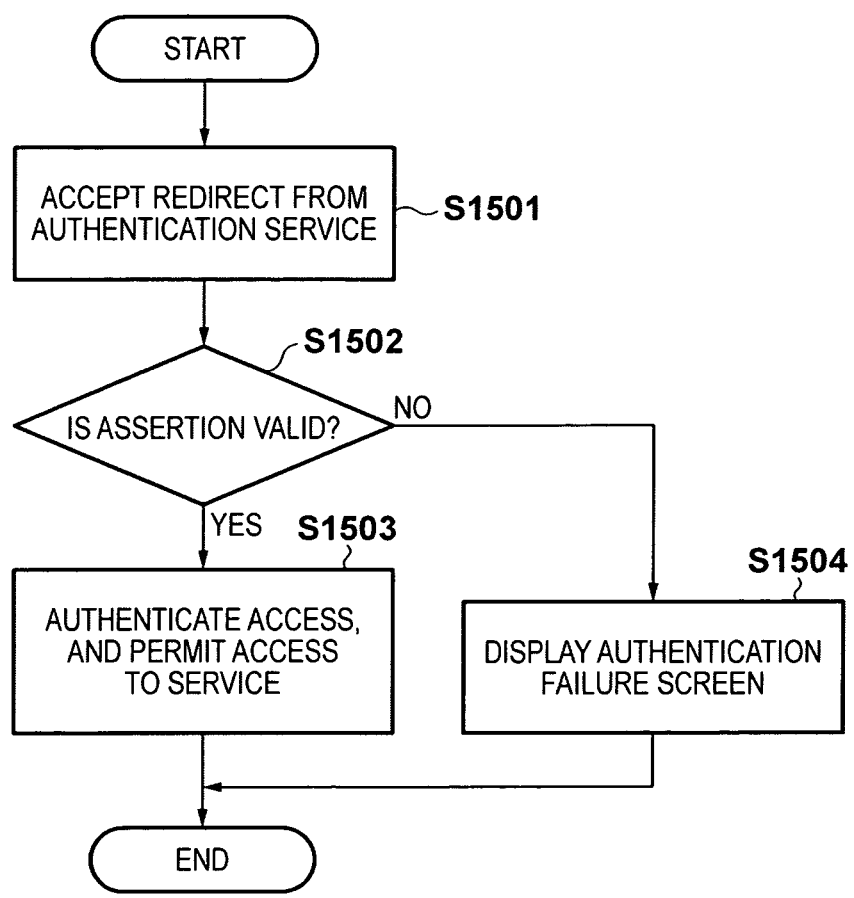
FIG. 15 is a flowchart illustrating a procedure executed by authentication service A to achieve SSO.

FIG. 15 shows a procedure executed by the authentication service A 400 to achieve SSO according to the embodiment. The procedure starts when the authentication service B 450 successfully authenticates the user access and the access is redirected in step S1404 of FIG. 14.

In step S1501, the authentication service A 400 accepts the redirect from the authentication service B 450. In step S1502, the assertion validation module 402 validates whether the assertion included in the redirect accepted in step S1501 is valid. If it is determined as a result of the validation that the assertion is valid (YES in step S1502), the process advances to step S1503; otherwise (NO in step S1502), the process advances to step S1504.

In step S1503, the service A authentication module 401 authenticates the redirect accepted in step S1501 to permit access to the service. That is, the service providing service A 500 is permitted to provide the service. If the authentication service A 400 has received access destination information after completion of authentication in step S1501, the user access is redirected based on the access destination information. If, as described above, the service providing service A 500 has been designated as a redirect destination after completion of authentication, the user access is redirected to the service providing service A 500. Since the user access has been authenticated at this time, the user can use the service provided by the service providing service A 500. Upon completion of the redirect, the procedure ends.

In step S1504, the service A authentication module 401 displays a screen for notifying the user that authentication has failed because the assertion was invalid, thereby terminating the procedure. At this time, the client PC 200 displays the authentication failure screen transmitted from the service A authentication module 401. This screen may be a screen for only indicating that authentication has failed or a screen for transiting to the screen for causing the authentication service B 450 to perform authentication again.

(Processing in Service Providing Service A)

Figure 16:
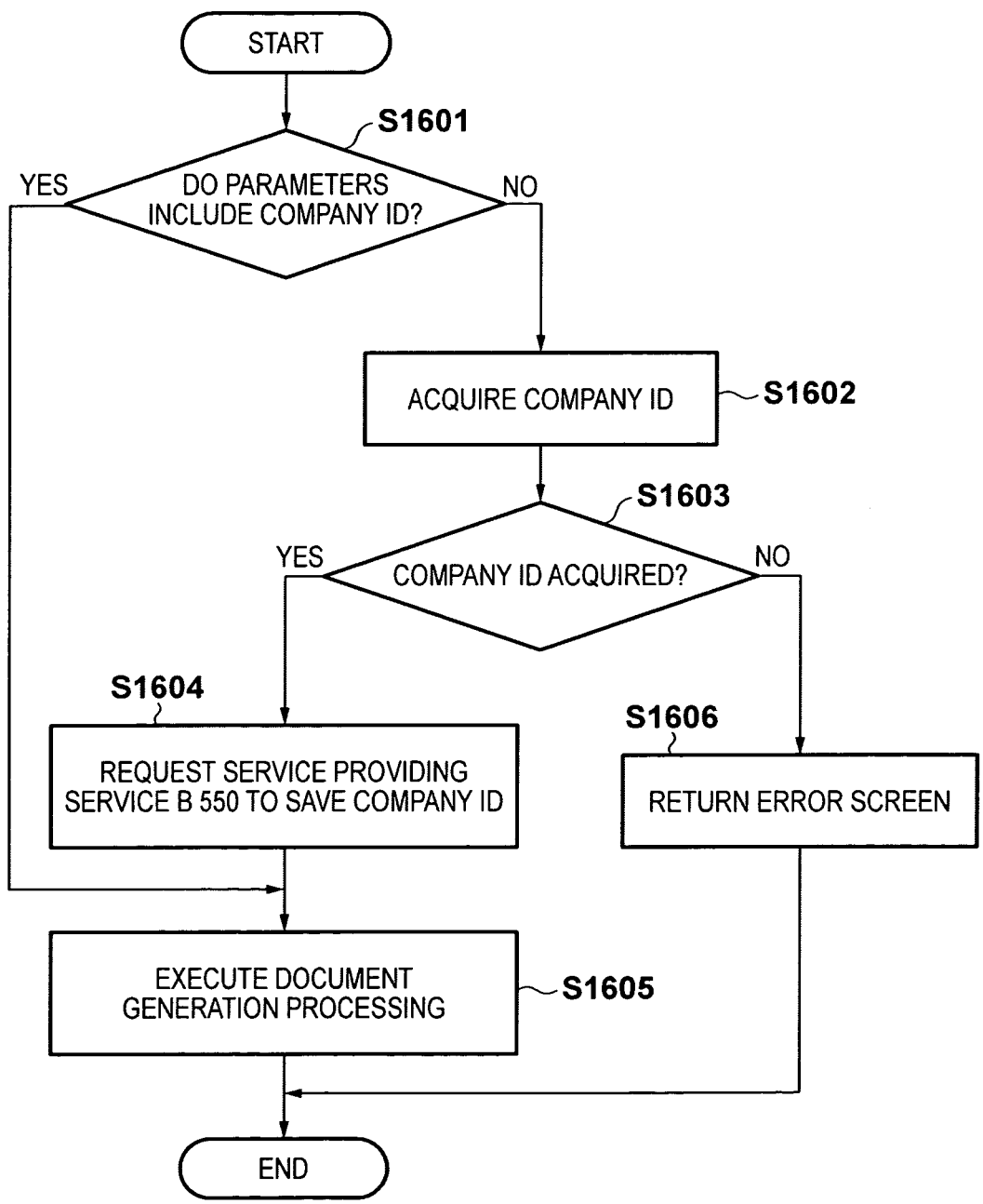
FIG. 16 is a flowchart illustrating a procedure executed by service providing service A.

FIG. 16 shows a procedure executed by the service providing service A 500 according to the embodiment. The procedure corresponds to the processing in step S1203 of FIG. 12.

In step S1601, the company ID saving determination module 502 determines whether the URL parameters include a company ID. If it is determined that a company ID is included (YES in step S1601), the process advances to step S1605; otherwise (NO in step S1601), the process advances to step S1602.

In step S1602, the company ID acquisition module 503 acquires a company ID from the HTTP header. In step S1603, the company ID acquisition module 503 determines whether a company ID has been acquired (first determination). If a company ID has not been acquired, for example, the HTTP header includes no company ID (NO in step S1603), the page generation module 507 returns an error screen, thereby terminating the procedure.

If a company ID has been acquired (YES in step S1603), the company ID saving module 504 requests the service providing service B 550 to save the acquired company ID in step S1604. Saving the company ID is requested when the company ID saving module 504 acquires the values of "sessionid" and "serverurl" from the URL parameters to set them in a request header, and requests to add a company ID record.

After that, in step S1605, the data acquisition module 505 acquires the parameter "recordid" from the parameters, and sends a business data acquisition request (query) to the service providing service B 550. Furthermore, the document generation module 506 acquires a form managed by the form management module (not shown), and generates document data based on acquired business data and the form acquired from the form management module (not shown). The document generation processing in step S1605 is well known, and a description thereof will be omitted. Then, the page generation module 507 generates a response page, and returns it to the client PC 200.

(Processing in Service Providing Service B)

FIG. 17 shows a procedure executed by the service providing service B 550 according to the embodiment. The procedure starts in response to the request in step S1604 of FIG. 16.

In step S1701, the service providing service B 550 accepts the company ID saving request from the service providing service A 500. In step S1702, the company ID management module 5531 acquires the company ID included in the accepted request, and saves, in the storage unit, the company ID acquired in step S1703. Then, the procedure ends.

According to this embodiment, by prompting the user to input tenant information only once, and using the input tenant information, it becomes possible to perform SSO without prompting the user to input the tenant information thereafter.

Second Embodiment

The second embodiment of the present invention will be described next with reference to the accompanying drawings. Note that a description of parts common to the first embodiment will be omitted, and only different parts will be described below.

[Module Configuration of Service Providing Service A]

Figure 18:
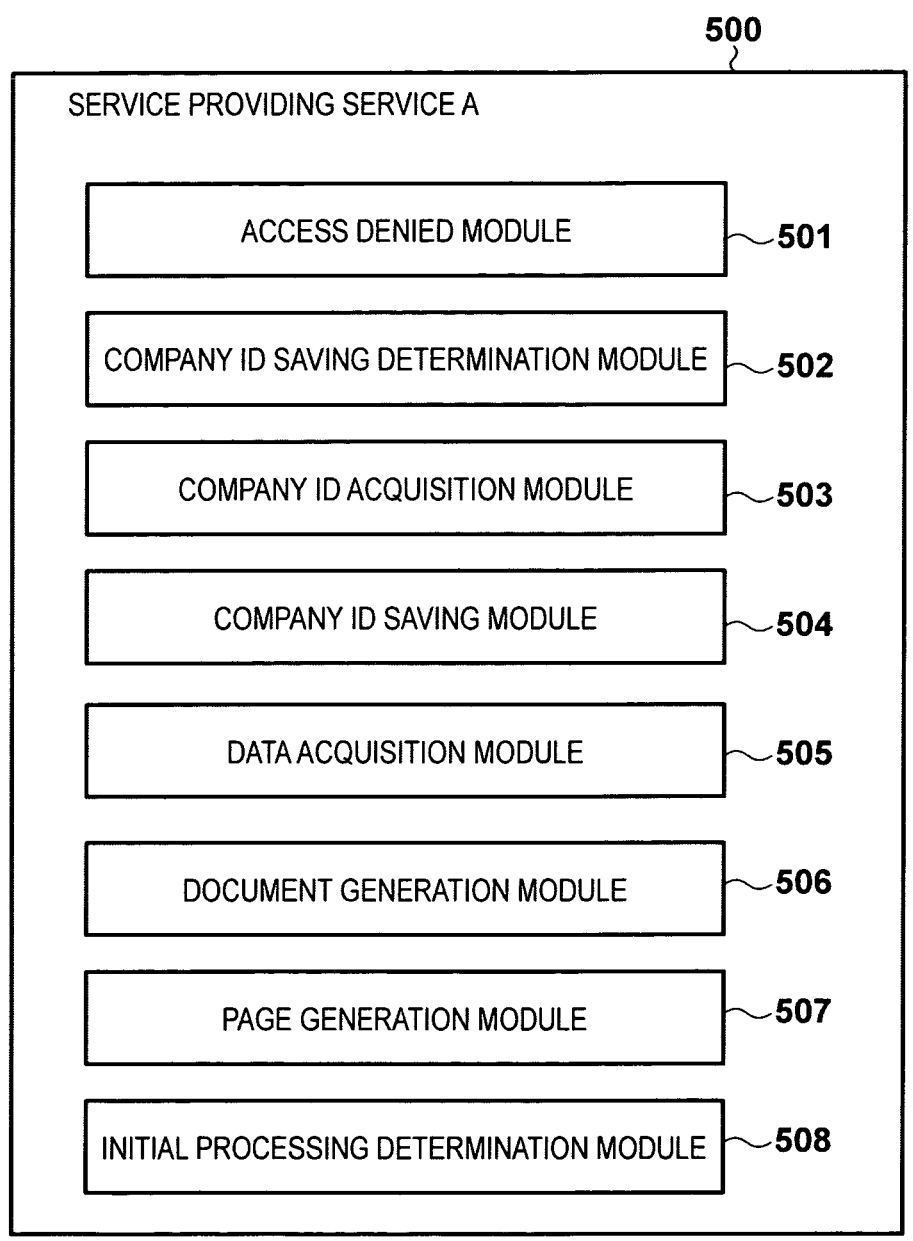
FIG. 18 is a block diagram showing the module configuration of service providing service A according to the second embodiment.

FIG. 18 is a block diagram showing the module configuration of a service providing service A 500 according to this embodiment. Note that the same reference numerals denote the same modules as those in FIG. 4, and only different parts will be described below. The service providing service A 500 according to the embodiment further includes an initial processing determination module 508. The initial processing determination module 508 determines whether URL parameters include a parameter "init".

FIG. 19 is a view showing an example of the description of button settings according to the embodiment. Note that the same reference numerals denote the same components as those in FIG. 9, and only different parts will be described below. Contents 1903 of a JavaScript® code to be executed are defined.

Upon press of a button 702 set as shown in FIG. 19, the JavaScript® code is executed on the browser of a client PC 200, and another window is displayed to redirect access to "http://service_a/service". At this time, if an acquired company ID as a URL parameter of the redirect is null, the parameter "init" is included.

[Processing Procedure]

Processing according to the embodiment will be described. Note that processes in the client PC and service providing service A, which are different from those in the first embodiment, will be explained here.

(Processing in Client PC)

Figure 20:
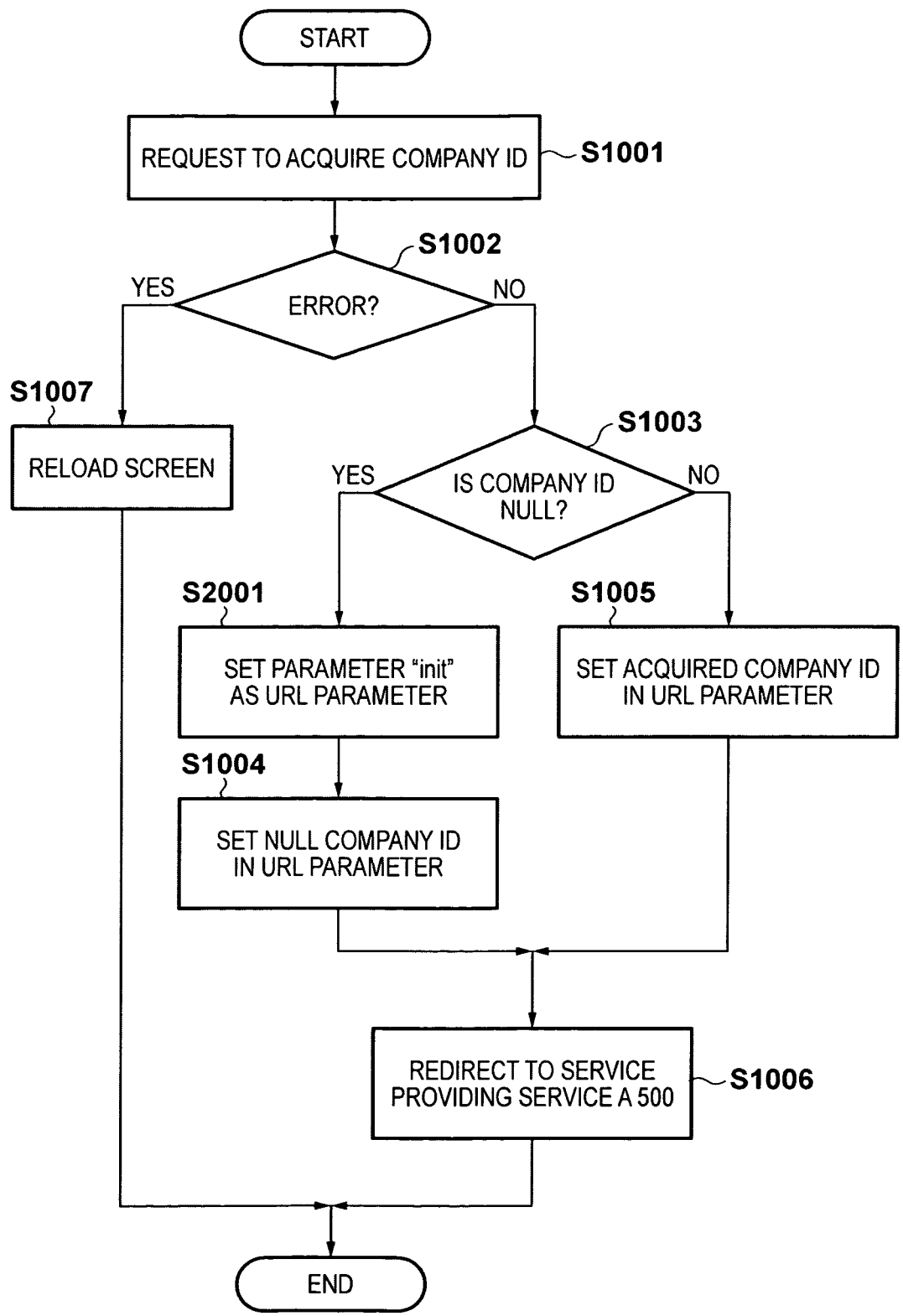
FIG. 20 is a flowchart illustrating a procedure executed by the browser of a client PC according to the second embodiment.

FIG. 20 shows a procedure executed by the browser of the client PC 200 according to the embodiment. Note that the same reference symbols denote the same processes as those in FIG. 10 described in the first embodiment, and only different parts will be described below.

The browser of the client PC 200 determines whether the value of a company ID acquired in step S1003 is null. If the value of the acquired company ID is null (YES in step S1003), the browser of the client PC 200 sets "true" in the parameter "init" of the URL parameters in step S2001. The parameter "init" indicates whether the company ID is null. The parameter "init" is added to the URL parameters, and is set as a parameter different from a parameter "TENAN_ID". Note that the parameter name is not limited to "init".

(Processing in Service Providing Service A)

Figure 21:
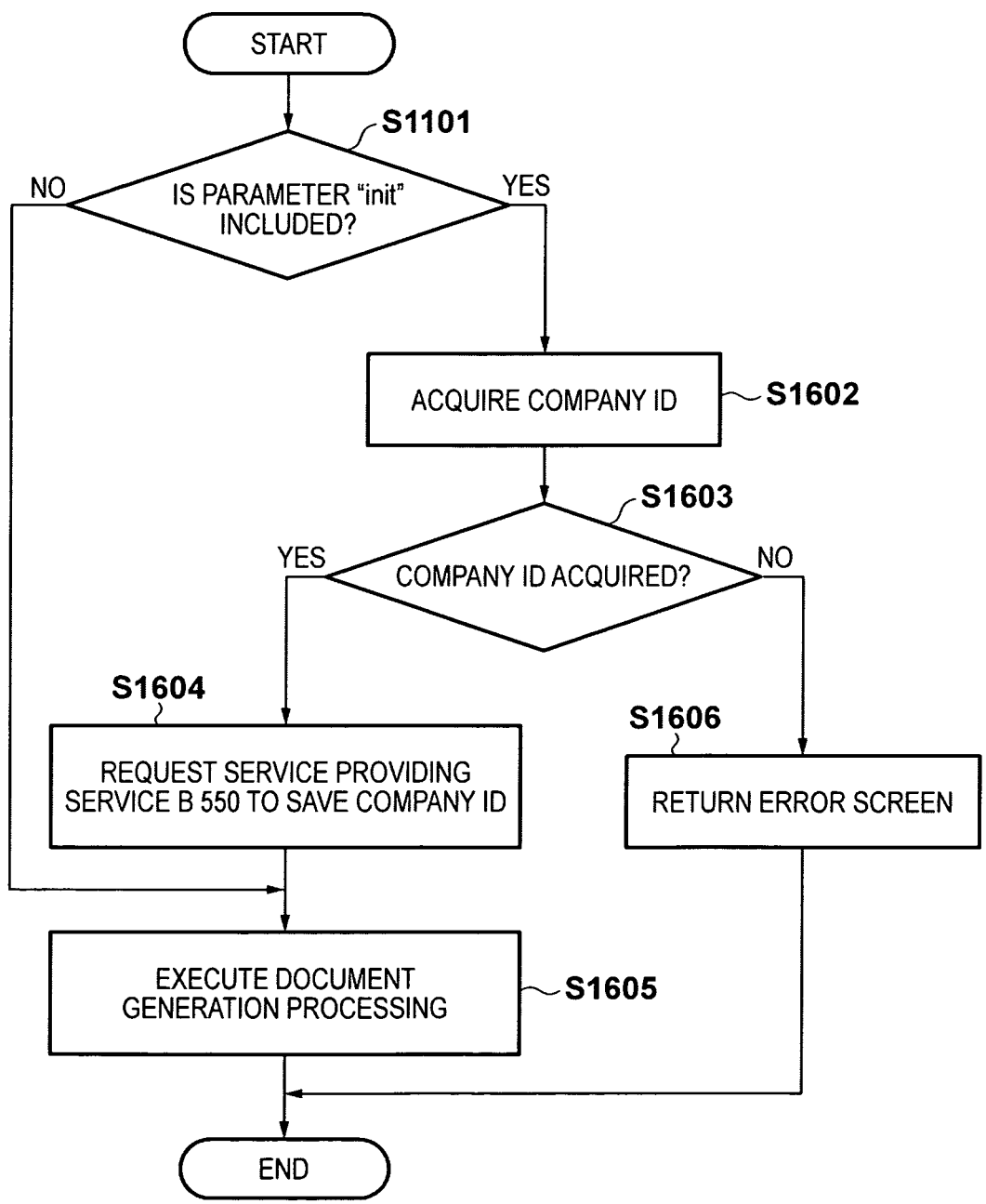
FIG. 21 is a flowchart illustrating a procedure executed by service providing service A according to the second embodiment.

FIG. 21 shows a procedure executed by the service providing service A 500 according to the embodiment. Note that the same reference symbols denote the same processes as those in FIG. 16, and only different parts will be described below. In step S2101, the initial processing determination module 508 determines whether the URL parameters include the parameter "init". If it is determined that the parameter "init" is not included (NO in step S2101), the process advances to step S1605; otherwise (YES in step S2101), the process advances to step S1602. In step S1602, a company ID acquisition module 503 acquires a company ID from an HTTP header. The process thereafter is the same as that described with reference to FIG. 16 in the first embodiment.

According to this embodiment, as in the first embodiment, by prompting the user to input tenant information only once, it is possible to perform SSO without prompting the user to input the tenant information thereafter.

Third Embodiment

The third embodiment of the present invention will be described next with reference to the accompanying drawings. Note that a description of parts common to the first embodiment will be omitted, and only different parts will be described below.

[Module Configuration of Service Providing Service A]

Figure 22:
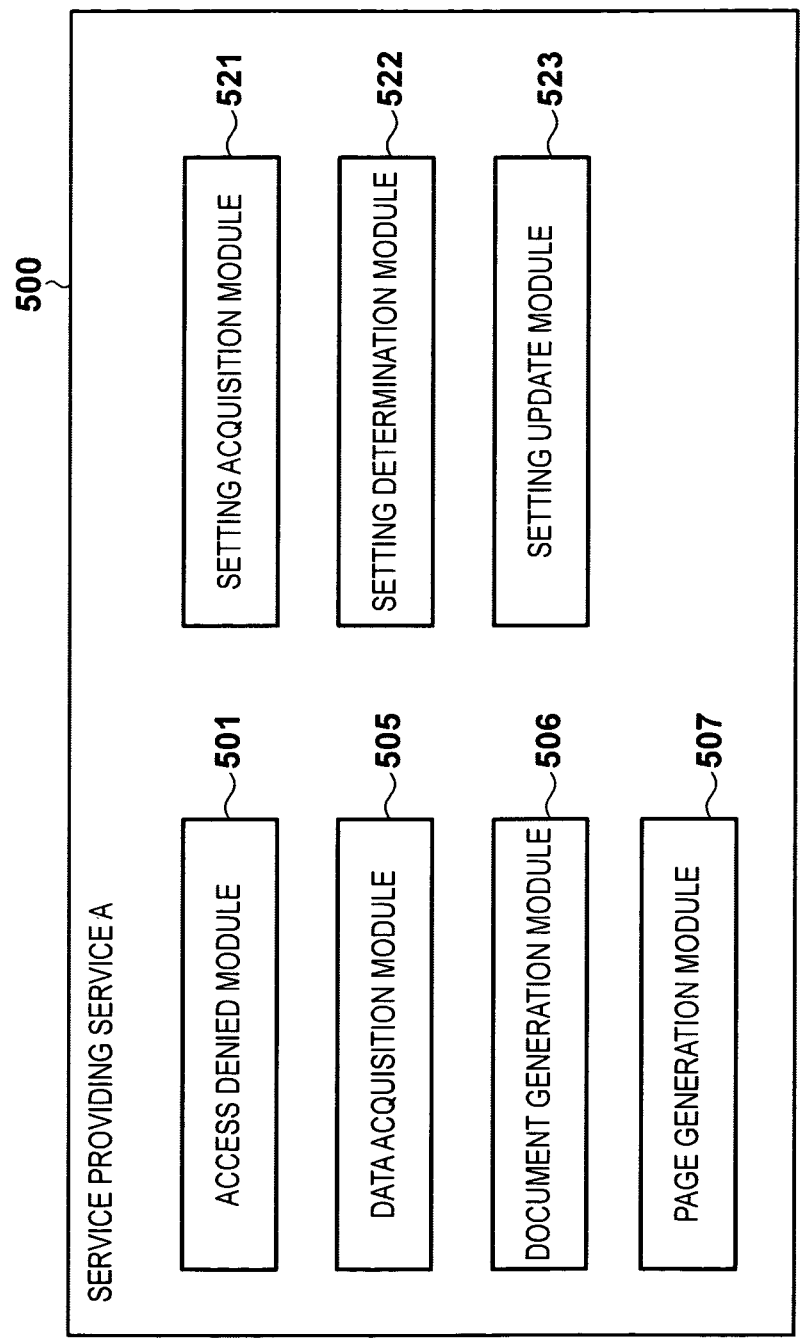
FIG. 22 is a block diagram showing the module configuration of service providing service A according to the third embodiment.

FIG. 22 is a block diagram showing the module configuration of a service providing service A 500 according to this embodiment. Note that the same reference numerals denote the same modules as those in FIG. 4, and only different parts will be described below. The service providing service A 500 includes a setting acquisition module 521, a setting determination module 522, and a setting update module 523. The setting acquisition module 521 acquires button settings from a service providing service B 550. The setting determination module 522 determines the URL of the acquired button settings. The setting update module 523 updates the button settings of the service providing service B 550 by changing the URL of the button settings.

[Module Configuration of Service Providing Service A]

Figure 23:
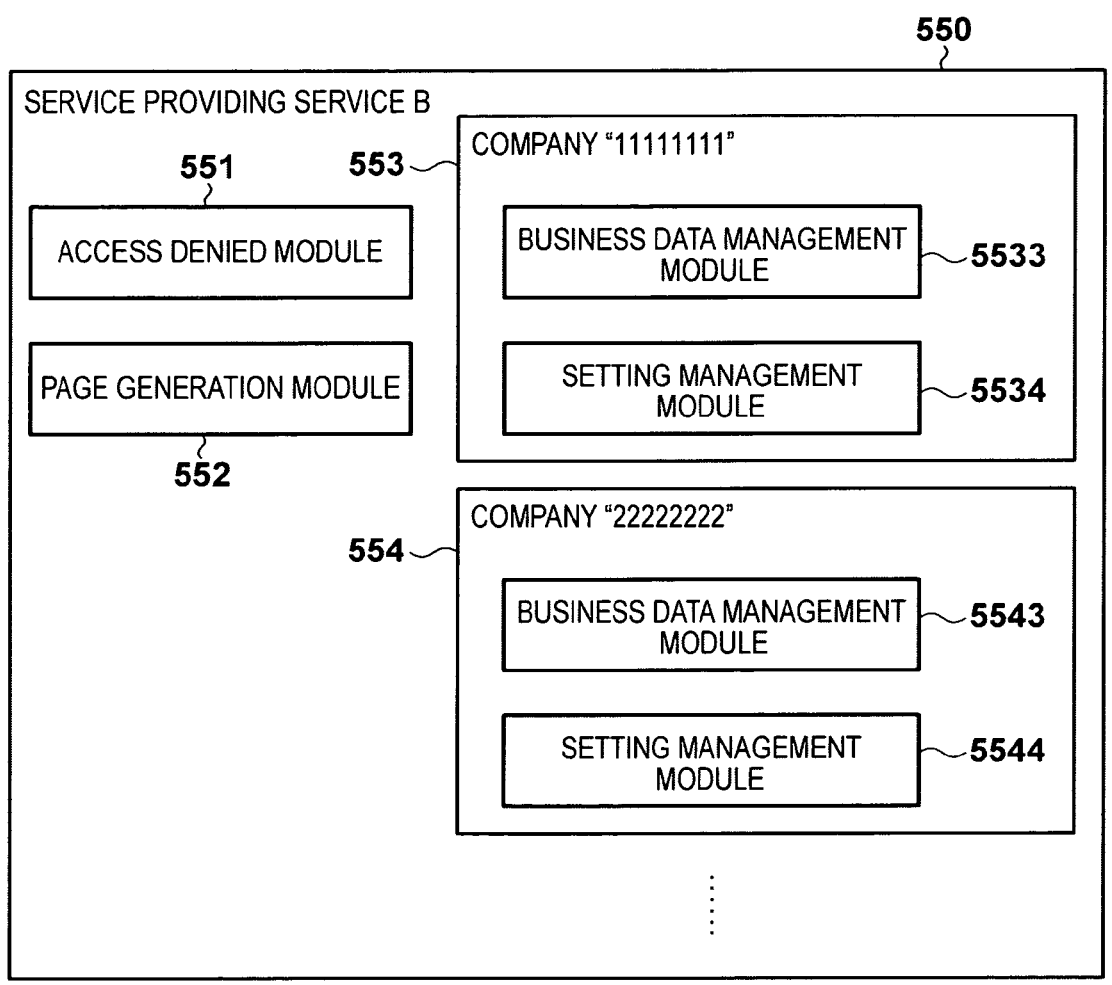
FIG. 23 is a block diagram showing the module configuration of service providing service B according to the third embodiment.

FIG. 23 is a block diagram showing the module configuration of the service providing service B 550 according to the embodiment. Note that the configuration (FIG. 23) of this embodiment is different from that (FIG. 5) of the first embodiment in that the company ID management module 5531 and the company ID acquisition module 5532 do not exist. That is, the service providing service B 550 does not hold or manage company IDs. Note that in this embodiment, a business data management module and a setting management module are defined for each company (tenant). Although one tenant will be exemplified in the following description, each module operates in response to a request. Note that the modules managed for each tenant may be stored in one hard disk (HD) 211 to manage data for each tenant in a logically separated manner, or may be stored in separate hard disks (HDs) 211 to manage data for each tenant in a physically separated manner.

FIG. 24 is a view showing an example of the description of the button settings according to the embodiment. Note that the same reference numeral denotes the same component as that in FIG. 9, and only different parts will be described below. Referring to FIG. 24, accessing a URL designated in contents 2403 is set as an operation 2402 executed upon press of a button 702 shown in FIG. 7.

Upon press of the button 702 set as shown in FIG. 24, the browser of a client PC 200 redirects access to "http://service_a/service". As the URL parameters of the redirect, parameters "TENANT_ID" (an initial value is null), "sessionid", "serverurl", and "recordid" are included. The parameter "sessionid" indicates the session ID of an authenticated user. The parameter "serverurl" indicates a URL for accessing the service providing service B 550. The parameter "recordid" indicates the record ID of a business meeting record.

[Processing in Service Providing Service A]

FIG. 25 shows a procedure executed by the service providing service A 500 according to the embodiment. Note that the same reference symbols denote the same processes as those in FIG. 16, and only different parts will be described below.

If it is determined in step S1603 that a company ID has been acquired (YES in step S1603), the setting acquisition module 521 acquires button settings from the service providing service B 550 in step S2501. The button settings are as shown in FIG. 24. In step S2502, the setting determination module 522 determines whether the URL of the acquired button settings indicates the URL of the service providing service A 500. If it is determined that the URL of the button settings indicates the URL of the service providing service A 500 (YES in step S2502), the process advances to step S2503; otherwise (NO in step S2502), the process advances to step S2504.

In step S2503, the setting update module 523 adds the company ID acquired in step S1602 to the parameter "TENANT_ID" of the URL of the button settings. That is, the setting update module 523 adds the practical value of the acquired company ID to the button settings. Then, the setting update module 523 requests the service providing service B 550 to update the button settings. That is, the setting update module 523 requests the service providing service B 550 to associate, with the button 702, the contents (corresponding to the contents 2403 in FIG. 24) set with the specific company ID. In step S2504, the setting update module 523 determines whether there are other acquired button settings. If it is determined that there are other button settings (NO in step S2504), the processing in steps S2502 and S2503 is repeated; otherwise (YES in step S2504), the process advances to step S1605.

According to this embodiment, in addition to the effects of the first embodiment, tenant information is directly set as button settings. This eliminates the need to additionally prepare a module for managing tenant information and that for acquiring tenant information on the service providing service B 550. Furthermore, even if a module for managing information is held in advance, it is not necessary to newly add a module.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-157125, filed Jul. 15, 2011, which is hereby incorporated by reference herein in its entirety.

What is claimed is:

1. A system in which a first service providing apparatus, a second service providing apparatus, a relay apparatus, and at least one authentication apparatus cooperate with each other to provide a service by single sign-on to be used by a user through a browser of a client terminal, said second service providing apparatus comprising:
a management unit configured to manage belonging information for specifying a group to which the user belongs; and
a transmission unit configured to transmit to the client terminal, when an instruction to provide a service by said first service providing apparatus is accepted from the user while providing a service by said second service providing apparatus, information for accessing said first service providing apparatus and the belonging information if said management unit manages the belonging information of the group to which the user belongs,
wherein, when an instruction to provide the service of said first service providing apparatus is accepted from a client terminal for which said management unit does not manage belonging information, said transmission unit of said second service providing apparatus transmits the information for accessing said first service providing apparatus as a parameter without transmitting the belonging information,
said first service providing apparatus comprising:
a request unit configured to request, if authentication of access from the client terminal based on the information for accessing the first service providing apparatus transmitted by the transmission unit of the second service providing apparatus is not complete, said relay apparatus to execute authentication processing by said authentication apparatus;
a providing unit configured to provide the service according to a result of the authentication processing by said authentication apparatus;
a first determination unit configured to determine whether the client terminal could acquire the belonging information from said second service providing apparatus together with the information for accessing said first service providing apparatus in the access from the client terminal that has been authenticated; and
an instruction unit configured to cause, if said first determination unit determines that the belonging information could not be acquired from said second service providing apparatus, said management unit of said second service providing apparatus to save belonging information acquired by accepting the belonging information from the user by said relay apparatus, and
said relay apparatus comprising:
a second determination unit configured to determine, when a request is received from said first service providing apparatus, whether the client terminal could acquire, from the parameter, the belonging information from said second service providing apparatus besides the information, included in the parameter, for accessing said first service providing apparatus;
an acceptance unit configured to accept, if said second determination unit determines that the belonging information could not be acquired from said second service providing apparatus, belonging information from the users; and
an authentication request unit configured to, based on the belonging information acquired by the client terminal from said second service providing apparatus or the belonging information accepted by said acceptance unit, select one authentication apparatus associated with the belonging information from the at least one authentication apparatus, and to request authentication processing to the selected authentication apparatus.

2. The system according to claim 1, wherein in response to an instruction by said instruction unit of said first service providing apparatus, said management unit of said second service providing apparatus saves the belonging information acquired by said relay apparatus.

3. The system according to claim 1, wherein the information for accessing said first service providing apparatus is a URL of said first service providing apparatus.

4. The system according to claim 3, wherein the belonging information is set as a parameter of the URL.

5. The system according to claim 1, wherein when an instruction to provide the service of said first service providing apparatus is accepted again from the user corresponding to the belonging information which has been saved by said instruction unit of said first service providing apparatus, said transmission unit of said second service providing apparatus transmits the saved belonging information.

6. The system according to claim 1, wherein said second service providing apparatus further comprises a providing unit configured to provide a screen for accepting an instruction to provide the service of said first service providing apparatus and a program to be executed by the client terminal upon accepting the instruction.

7. The system according to claim 6, wherein said transmission unit of said second service providing apparatus executes processing in response to an instruction issued by executing the program.

8. The system according to claim 1, wherein,
if said management unit does not manage belonging information, said transmission unit of said second service providing apparatus further transmits information indicating that the belonging information is not managed,
said first determination unit of said first service providing apparatus determines whether the client terminal has received the information indicating that the belonging information is not managed from said second service providing apparatus, and
if said first determination unit determines that the information indicating that the belonging information is not managed has been received, said instruction unit of said first service providing apparatus causes said management unit of said second service providing apparatus to save belonging information acquired by accepting the belonging information from the user by said relay apparatus.

9. A system in which a first service providing apparatus, a second service providing apparatus, a relay apparatus, and at least one authentication apparatus cooperate with each other to provide a service by single sign-on to be used by a user through a browser of a client terminal, said second service providing apparatus comprising:
a providing unit configured to provide, when providing a service by said second service providing apparatus, a screen for accepting an instruction to provide a service by said first service providing apparatus and a program to be executed by the client terminal upon accepting the instruction,
said first service providing apparatus comprising:
a request unit configured to request, if authentication of access from the client terminal performed by executing the program is not complete, said relay apparatus to execute authentication processing by said authentication apparatus;

a providing unit configured to provide the service according to a result of the authentication processing by said authentication apparatus;

a first determination unit configured to determine whether belonging information for specifying a group to which the user belongs could be acquired from the client terminal in the access from the client terminal that has been authenticated;

an update unit configured to acquire, if said first determination unit determines that the belonging information could not be acquired, the program from said second service providing apparatus, and to update the program to transmit to said first service providing apparatus, when the program is executed, belonging information acquired by accepting the belonging information from the user by said relay apparatus; and an instruction unit configured to cause, when providing a program from then on, said providing unit of said second service providing apparatus to provide the client terminal with the program updated by said update unit, and said relay apparatus comprising:

a second determination unit configured to determine, when a request is received from said first service providing apparatus, whether said first service providing apparatus could acquire the belonging information from the client terminals;

an acceptance unit configured to accept, if said second determination unit determines that the belonging information could not be acquired, belonging information from the user; and an authentication request unit configured to, based on the belonging information acquired from the client terminal or the belonging information accepted by said acceptance unit, select one authentication apparatus associated with the belonging information from the at least one authentication apparatus, and to request authentication processing to the selected authentication apparatus.

10. A first service providing apparatus of a system in which said first service providing apparatus, a second service providing apparatus, a relay apparatus, and at least one authentication apparatus cooperate with each other to provide a service by single sign-on to be used by a user through a browser of a client terminal, said first service providing apparatus comprising:

a request unit configured to request, if authentication of access from the client terminal based on information for accessing said first service providing apparatus, that is provided by the second service providing apparatus, is not complete, the relay apparatus to execute authentication processing by the authentication apparatus;

a providing unit configured to provide the service according to a result of the authentication processing by the authentication apparatus;

a determination unit configured to determine whether the client terminal could acquire belonging information for specifying a group to which the user belongs from the second service providing apparatus together with the information for accessing said first service providing apparatus in the access from the client terminal that has been authenticated; and an instruction unit configured to cause, if said determination unit determines that the belonging information could not be acquired from the second service providing apparatus, the second service providing apparatus to save belonging information acquired by accepting the belonging information from the user by the relay apparatus.

11. A second service providing apparatus of a system in which a first service providing apparatus, said second service providing apparatus, a relay apparatus, and at least one authentication apparatus cooperate with each other to provide a service by single sign-on to be used by a user through a browser of a client terminal, said second service providing apparatus comprising:

a management unit configured to manage belonging information for specifying a group to which the user belongs; and a transmission unit configured to transmit to the client terminal, when an instruction to provide a service by the first service providing apparatus is accepted from the user while providing a service by said second service providing apparatus, information for accessing the first service providing apparatus and the belonging information if said management unit manages the belonging information of the group to which the user belongs, wherein said management unit saves belonging information acquired from the first service providing apparatus in response to an instruction by the first service providing apparatus, and wherein, when an instruction to provide the service of said first service providing apparatus is accepted from a client terminal for which said management unit does not manage belonging information, said transmission unit of said second service providing apparatus transmits the information for accessing said first service providing apparatus as a parameter without transmitting the belonging information.

12. A relay apparatus of a system in which a first service providing apparatus, a second service providing apparatus, said relay apparatus, and at least one authentication apparatus cooperate with each other to provide a service by single sign-on to be used by a user through a browser of a client terminal, said relay apparatus comprising:

a determination unit configured to determine, when a request is received from the first service providing apparatus, whether the client terminal could acquire, from a parameter, belonging information for specifying a group to which the user belongs from the second service providing apparatus besides information, included in the parameter, for accessing the first service providing apparatus;

an acceptance unit configured to accept, if said determination unit determines that the belonging information could not be acquired from the second service providing apparatus, belonging information from the user, and an authentication request unit configured to, based on the belonging information acquired by the client terminal from the second service providing apparatus or the belonging information accepted by said acceptance unit, select one authentication apparatus associated with the belonging information from the at least one authentication apparatus, and to request authentication processing to the selected authentication apparatus.

13. A control method for a system in which a first service providing apparatus, a second service providing apparatus, a relay apparatus, and at least one authentication apparatus cooperate with each other to provide a service by single sign-on to be used by a user through a browser of a client terminal, the method comprising:

in the second service providing apparatus;

a management step of managing belonging information for specifying a group to which the user belongs; and a transmission step of transmitting to the client terminal, when an instruction to provide a service by the first service providing apparatus is accepted from the user while providing a service by the second service providing apparatus, information for accessing the first service providing apparatus and the belonging information, if the belonging information of the group to which the user belongs is managed in the management step, wherein, when an instruction to provide the service of said first service providing apparatus is accepted from a client terminal for which said management step does not manage belonging information, said transmission step of said second service providing apparatus transmits the information for accessing said first service providing apparatus as a parameter without transmitting the belonging information, in the first service providing apparatus;

a request step of requesting, if authentication of access from the client terminal based on the information for accessing the first service providing apparatus transmitted by the transmission step of the second service providing apparatus is not complete, the relay apparatus to execute authentication processing by the authentication apparatus;

a providing step of providing the service according to a result of the authentication processing by the authentication apparatus;

a first determination step of determining whether the client terminal could acquire the belonging information from the second service providing apparatus together with the information for accessing the first service providing apparatus in the access from the client terminal that has been authenticated; and an instruction step of saving, if it is determined in the first determination step that the belonging information could not be acquired from the second service providing apparatus, belonging information acquired by accepting the belonging information from the user by the relay apparatus in the management step of the second service providing apparatus, and in the relay apparatus, a second determination step of determining, when a request is received from the first service providing apparatus, whether the client terminal could acquire, from the parameter, the belonging information from the second service providing apparatus besides the information, included in the parameter, for accessing the first service providing apparatus;

an acceptance step of accepting, if it is determined in the second determination step that the belonging information could not be acquired from the second service providing apparatus, belonging information from the user; and an authentication request step of, based on the belonging information acquired by the client terminal from the second service providing apparatus or the belonging information accepted in the acceptance step, selecting one authentication apparatus associated with the belonging information from the at least one authentication apparatus, and to request authentication processing to the selected authentication apparatus.

14. A control method of a system in which a first service providing apparatus, a second service providing apparatus, a relay apparatus, and at least one authentication apparatus cooperate with each other to provide a service by single sign-on to be used by a user through a browser of a client terminal, the method comprising:

in the second service providing apparatus, a providing step of providing, when providing a service by the second service providing apparatus, a screen for accepting an instruction to provide a service by the first service providing apparatus and a program to be executed by the client terminal upon accepting the instruction, in the first service providing apparatus:

a request step of requesting, if authentication of access from the client terminal performed by executing the program is not complete, the relay apparatus to execute authentication processing by the authentication apparatus;

a providing step of providing the service according to a result of the authentication processing by the authentication apparatus;

a first determination step of determining whether belonging information for specifying a group to which the user belongs could be acquired from the client terminal in the access from the client terminal that has been authenticated;

an update step of acquiring, if it is determined in the first determination step that the belonging information could not be acquired, the program from the second service providing apparatus, and updating the program to transmit to the first service providing apparatus, when the program is executed, belonging information acquired by accepting the belonging information from the user by the relay apparatus; and an instruction step of providing, when providing a program from then on in the providing step of the second service providing apparatus, the client terminal with the program updated in the update step, and in the relay apparatus:

a second determination step of determining, when a request is received from the first service providing apparatus, whether the first service providing apparatus could acquire the belonging information from the client terminal;

an acceptance step of accepting, if it is determined in the second determination step that the belonging information could not be acquired, belonging information from the user; and an authentication request step of, based on the belonging information acquired from the client terminal or the belonging information accepted in the acceptance step, selecting one authentication apparatus associated with the belonging information from the at least one authentication apparatus, and requesting authentication processing to the selected authentication apparatus.

15. A non-transitory computer-readable medium storing a program for causing a computer to function as a first service providing apparatus in a system in which said first service providing apparatus, a second service providing apparatus, a relay apparatus, and at least one authentication apparatus cooperate with each other to provide a service by single sign-on to be used by a user through a browser of a client terminal, the program executed by the first service providing apparatus comprising:

a request step of requesting, if authentication of access from the client terminal based on information for accessing said first service providing apparatus, that is provided by the second service providing apparatus, is not complete, the relay apparatus to execute authentication processing by the authentication apparatus;

a providing step of providing the service according to a result of the authentication processing by the authentication apparatus;

a determination step of determining whether the client terminal could acquire belonging information of a group to which a user belongs from the second service providing apparatus together with the information for accessing the first service providing apparatus in access from the client terminal that has been authenticated; and an instruction step of causing, if the determination step determines that the belonging information could not be acquired from the second service providing apparatus, the second service providing apparatus to save belonging information acquired by accepting the belonging information from the user by the relay apparatus.

16. A non-transitory computer-readable medium storing a program for causing a computer to function as a second service providing apparatus of a system in which a first service providing apparatus, the second service providing apparatus, a relay apparatus, and at least one authentication apparatus cooperate with each other to provide a service by single sign-on to be used by a user through a browser of a client terminal, the program executed by the second service providing apparatus comprising:

a management step of managing belonging information for specifying a group to which a user belongs; and a transmission step of transmitting to the client terminal, when an instruction to provide a service by the first service providing apparatus is accepted from the user while providing a service by the second service providing apparatus, information for accessing the first service providing apparatus and the belonging information if the management step manages the belonging information of the group to which the user belongs, wherein the management step saves belonging information acquired from the first service providing apparatus in response to an instruction by the first service providing apparatus, and wherein, when an instruction to provide the service of said first service providing apparatus is accepted from a client terminal for which said management step does not manage belonging information, said transmission step of said second service providing apparatus transmits the information for accessing said first service providing apparatus as a parameter without transmitting the belonging information.

17. A non-transitory computer-readable medium storing a program for causing a computer to function as a relay apparatus of a system in which a first service providing apparatus, a second service providing apparatus, said relay apparatus, and at least one authentication apparatus cooperate with each other to provide a service by single sign-on to be used by a user through a browser of a client terminal, said program executed by the relay apparatus comprising:

a determination step of determining, when a request is received from the first service providing apparatus, whether the client terminal could acquire, from a parameter, belonging information for specifying a group to which a user belongs from the second service providing apparatus besides information, included in the parameter, for accessing the first service providing apparatus;

an acceptance step of accepting, if the determination step determines that the belonging information could not be acquired from the second service providing apparatus, belonging information from the users; and an authentication request step of, based on the belonging information acquired by the client terminal from the second service providing apparatus or the belonging information accepted by the acceptance unit, selecting one authentication apparatus associated with the belonging information from the at least one authentication apparatus, and requesting authentication processing to the selected authentication apparatus.

* * * * *